US007312444B1

(12) United States Patent
Willougbhy et al.

(10) Patent No.: US 7,312,444 B1
(45) **Date of Patent: *Dec. 25, 2007**

(54) ATMOSPERIC PRESSURE QUADRUPOLE ANALYZER

(75) Inventors: Ross Clark Willoughby, Pittsbugh, PA (US); Edward William Sheehan, Pittsbugh, PA (US)

(73) Assignee: Chem - Space Associates, Inc., Pittsburgh, PA (US)

( * ) Notice: Subject to any disclaimer, the term of this patent is extended or adjusted under 35 U.S.C. 154(b) by 377 days.

This patent is subject to a terminal disclaimer.

(21) Appl. No.: 11/135,769

(22) Filed: May 24, 2005

(51) Int. Cl.
*H01J 49/26* (2006.01)
*H01J 49/16* (2006.01)
*B01D 59/44* (2006.01)

(52) U.S. Cl. ...................... 250/293; 250/292; 250/288; 250/290; 250/299; 250/396 R; 250/397

(58) Field of Classification Search ................ 250/293, 250/292
See application file for complete search history.

(56) References Cited

U.S. PATENT DOCUMENTS

| | | | | |
|---|---|---|---|---|
| 3,935,452 | A | 1/1976 | Prince | |
| 4,540,884 | A | 9/1985 | Stafford et al. | |
| 5,420,424 | A | 5/1995 | Carnahan et al. | |
| 5,420,425 | A | 5/1995 | Bier et al. | |
| 5,521,380 | A | 5/1996 | Wells et al. | |
| 5,521,382 | A | 5/1996 | Tanaka et al. | |
| 6,107,628 | A | 8/2000 | Smith et al. | |
| 6,124,592 | A | 9/2000 | Spangler | |
| 6,177,668 | B1 | 1/2001 | Hager | |
| 6,495,823 | B1 | 12/2002 | Miller et al. | |
| 6,512,224 | B1 | 1/2003 | Miller et al. | |
| 6,534,764 | B1 | 3/2003 | Verentchikov et al. | |
| 6,621,077 | B1 | 9/2003 | Guevremont et al. | |
| 6,690,004 | B2 | 2/2004 | Miller et al. | |
| 6,700,120 | B2 | 3/2004 | Hager | |
| 6,703,607 | B2 | 3/2004 | Stott et al. | |
| 6,713,757 | B2 | 3/2004 | Tanner et al. | |
| 6,730,904 | B1 | 5/2004 | Wells | |
| 6,781,117 | B1 * | 8/2004 | Willoughby et al. | 250/281 |
| 6,784,424 | B1 * | 8/2004 | Willoughby et al. | 250/292 |

(Continued)

OTHER PUBLICATIONS

Miller, P.E., et al., “The quadrupole mass filter: Basic operating concepts,” J. Chem. Ed. 63, pp. 617-622 (1986).

(Continued)

*Primary Examiner*—Robert Kim
*Assistant Examiner*—Bernard Souw

(57) ABSTRACT

The present invention relates to an apparatus and method for focusing, separating, and detecting gas-phase ions using the principles of electrohydrodynamic quadrupole fields at high pressures, at or near atmospheric pressure. Ions are entrained in a concentric flow of gas and travel through a high-transmission element into a RF/DC quadrupole, exiting out of the RF/DC quadrupole, and then impacting on an ion detector, such as a faraday plate; or through an aperture or capillary tube with subsequent identification by a mass spectrometer. Ions with stable trajectories pass through the RF/DC quadrupole while ions with unstable trajectories drift off-axis collide with the rods and are lost. Alternatively, detection of ions with unstable trajectories can be accomplished by allowing the ions to pass through the rods and be detected by an off-axis detector. Embodiments of this invention are devices and methods for focusing, separating, and detecting gas-phase ions at or near atmospheric pressure, when coupled to mass spectrometers.

20 Claims, 17 Drawing Sheets

U.S. PATENT DOCUMENTS

| | | | | |
|---|---|---|---|---|
| 6,797,950 | B2 | 9/2004 | Schwartz et al. | |
| 6,806,463 | B2 | 10/2004 | Miller et al. | |
| 6,815,668 | B2 | 11/2004 | Miller et al. | |
| 6,815,669 | B1 | 11/2004 | Miller et al. | |
| 6,818,889 | B1 * | 11/2004 | Sheehan et al. | 250/288 |
| 6,838,662 | B2 * | 1/2005 | Bateman et al. | 250/286 |
| 6,914,243 | B2 * | 7/2005 | Sheehan et al. | 250/288 |
| 6,943,347 | B1 * | 9/2005 | Willoughby et al. | 250/288 |
| 6,949,740 | B1 * | 9/2005 | Sheehan et al. | 250/288 |
| 6,972,407 | B2 | 12/2005 | Miller et al. | |
| 7,081,621 | B1 * | 7/2006 | Willoughby et al. | 250/288 |
| 2003/0132380 | A1 | 7/2003 | Miller et al. | |
| 2004/0094704 | A1 | 5/2004 | Miller et al. | |
| 2004/0124354 | A1 * | 7/2004 | Bateman et al. | 250/288 |
| 2005/0092918 | A1 | 5/2005 | Smith et al. | |
| 2005/0258361 | A1 * | 11/2005 | Whitehouse et al. | 250/288 |

OTHER PUBLICATIONS

Steel, C., et al., "Understanding the quadrupole mass filter through computer stimulations," J. Chem. Ed. 75, pp. 1049-1054 (1998).

Hill, H.H., et al., "Ion mobility spectrometry," Anal. Chem. 62, pp. 1201A-1209A (1990).

Johnson, J.V., et al., "The stretched quadrupole ion trap: Implications for the Mathieu . . . ," Rapid Commun. Mass Spectrom. 6, pp. 760-764 (1992).

Buryakov, I.A., et al. "A New method of separation of multi-atomic ions by mobility at atomospheric . . . ," Int. J. Mass Spectrom. Ion Processes 128, pp. 143-148 (1993).

Wittmer, D., et al., "Electrospray ionization ion mobility spectrometry," Anal. Chem. 66, pp. 2348-2355 (1994).

Thomson, B.A., et al., "Improved collisionally activated dissociation efficiemcy and mass resolution on a triple quadrupole . . . ", J. Anal. Chem. 67, pp. 1696-1704 (1995).

Thomson, B., et al., "RF-only quadrupole with axial fields", Proceedings of the 44th ASMS Conference on Mass Spectrometry and Allied . . . , May 12-17, 1996, Portland, OR.

Wyttenbach, T., et al., "Gas-phase conformation of biological molecules: Bradykinin," J. Am. Chem. Soc. 118, pp. 8355-8364 (1996).

Guevremont, R., et al., "Ion mobility / TOF mass spectrometrometric investigation of ions . . . ," Proceedings of the 45th ASMS Conference, Jun. 1-5, 1997, Palm Springs, CA.

Titov, V.V., "Detailed study of the quadrupole mass analyzer operating within the first, second, and third . . . ," J. Am. Soc. Mass Spectrometry 9, pp. 50-69 (1998).

Purves, R.W., et al., "Electrospray ionization high-field asymmetric waveform ion mobility spectrometry-mass spectrometry," Anal. Chem. 71, pp. 2346-2357 (1999).

Ells, B., et al., "Detection of chlorinated and brominated byproducts of drinking water disinfection using electrospray . . . ,"Anal. Chem. 71, pp. 4747-4752 (1999).

Covey, T., et al., "Collision cross sections for protein ions," J. Am. Soc. Mass Spectrometry 4 , pp. 616-623 (1993).

Stafford, Jr., G., "Ion trap mass spectrometry: A personal perspective," J. Am. Soc. Mass Spectrometry 13 , pp. 589-596 (2002).

* cited by examiner

*a. Conventional Quadrupole Assembly*

*b. Applied Potentials*

*Positive Rods:* $V_t = V_{dc} + V_{rf} \cos \quad t + V_{ion\ energy}$

*Negative Rods:* $V_t = -V_{dc} - V_{rf} \cos \quad t + V_{ion\ energy}$

ATMOSPERIC PRESSURE QUADRUPOLE ANALYZER

GOVERNMENT SUPPORT

The invention described herein was made in part with United States Government support under Grant Number: 1 R43 RR15984-01 from the Department of Health and Human Services. The U.S. Government may have certain rights to this invention.

CROSS-REFERENCE TO RELATED APPLICATION

This application is entitled to the benefit of application Ser. No. 10/155,151, filed 2001 May 26, now U.S. Pat. No. 6,784,424, issued 2004 Aug. 31. In addition, this invention uses the high-transmission elements of our applications, Ser. No. 09/877,167, filed 2001 Jun. 8, now U.S. Pat. No. 6,744,041, issued 2004 Jun. 1; and Ser. No. 10/449,147, filed 2003 May 31, now U.S. Pat. No. 6,818,889, issued 2004 Nov. 16; Ser No. 10/862,304, filed 2003 Jun. 7, now U.S. patent publication No. 2005/0056776, issued 2005 Mar. 17; and Ser. No. 10/989,821, filed 2004 Nov. 15.

BACKGROUND

1. Field of Invention

This invention relates to an atmospheric RF/DC device, specifically to such RF/DC devices which are used for analyzing gas-phase ions at or near atmospheric pressure.

2. Description of Prior Art

Quadrupole Mass Spectrometry (QMS)

The analytical utility of a RF/DC (radio frequency/direct current) mass filter or analyzers, such as a quadrupole mass filter, as a device for continuous selection and separation of ions under conventional vacuum conditions is well established. It also has a highly developed theoretical basis (for example see, Paul et al. (1953), Dawson (1976), Miller et al. (1986), Steel et al. (1999), Titov (1998), Gerlich (1992). The desirable performance attributes of the quadrupole mass filter is the fact that motion in the x, y, and z directions are decoupled, (i.e. motion in each direction is independent of motion of the other directions in the Cartesian coordinate system, see Dawson (Chapter 2, 1976)). In general, a time varying potential is applied to opposite sets of parallel rods as illustrated in FIG. 1.

The "hyperbolic" geometry in the x-y plane coupled with the appropriate time-varying applied potential (an RF field) creates a pseudo-potential well that will trap ions within a "stable" mass range along the centerline of the x-y plane (the z-axis), while ejecting ions of "unstable" mass in the x and y directions. In a quadrupole operated a low pressures (under vacuum, $<10^{-3}$ torr), motion along the z-axis is generally determined by the initial energy of the ions as they enter the quadrupole field, and can be generally considered equivalent to motion in a field free environment. One notable exception to this field-free model would be the effects the fringing fields at the entrance and exit of the quadruple. At the entrance and exit from quadrupoles the x, y and z motions are coupled. This results in the transfer of small amounts of translational energy between the different dimensions. The effects of which can generally be reduced dramatically through electrode design (e.g. the use of RF-only pre- and post-filters).

Ion motion within a quadrupole is well characterized, and is described by the various solutions of the Mathieu equation (see Dawson (Chapter 3, 1976), Miller et al. (1986), Steel et al. (1998)). Simply stated, for a given ion with a particular mass-to-charge ratio (m/z), there exist sets of RF (alternating at the radio frequency) and DC (direct current) voltages, which when applied to a quadrupole yield stable trajectories. These sets of RF and DC voltages can be plotted to represent regions of stability both in the x and y directions (as shown in FIG. 2A). Since motion in the x and y directions are de-coupled, it is convenient to plot both directions in a single plot, focusing on the region(s) where stable trajectories are possible simultaneously in both the x and y directions. This region of stability is designated the "bandpass region".

According to the analytical theory based on the Mathieu equation, any set of voltages which do not lie within one of these regions of stability (in both x and y directions) will result in an unstable trajectory of ions, with exponentially increasing acceleration from the centerline of the quadrupole in the unstable direction (x or y). These stability boundaries tend to be very sharp, and can therefore be used to reject certain masses while accepting other masses. Since each mass has a unique set of stable voltages, judicious selection of voltages can allow selection of a narrow bandpass of masses (or one particular mass) to be transmitted through the quadrupole at the expense of all others as illustrated in FIG. 2B. Quadrupole mass spectrometers are typically scanned through the mass range by increasing both RF and DC voltages while maintaining a constant ratio (see "Scan Line" in FIG. 2B). The slope of the scan line determines the resolution of the mass spectrometer.

There is evidence that these stability boundaries observed with convention quadrupole operation are independent of the operating pressure, and therefore achieving a specific mass resolution should be possible even for a quadrupoles operated at higher pressures, such as atmospheric pressure. The majority of research with higher pressures has occurred in the pressure range of $1\times10^{-5}$ to $1\times10^{-1}$ torr with the three-dimensional quadrupole ion trap (for example, Johnson et al. (1992), U.S. Pat. No. 4,540,884 to Strafford et al. (1985)) and recently with two-dimensional (2-D) quadrupole linear traps (for example, U.S. Pat. No. 5,420,425 to Bier et al. (1995) and U.S. Pat. No. 6,797,950 to Schwartz et al. (2004); and commercialized by Applied Biosystems/MDS Sciex of Foster City, Calif., USA (see http://www.appliedbiosystems.com) and Thermo Electron Corp. of San Jose, Calif., USA (see http:/www.thermo.com)). It has been clearly observed with three-dimensional quadrupole ion traps that stability boundaries may actually be sharpened at these higher pressures yielding improved resolution. But there are limits with the operating pressures. As the pressure is increased in quadrupole devices the incidence of a gas discharge increases as illustrated in the studies of ion pipes by Bruce Thomson and coworkers (Thompson et al. (1995)).

FIG. 3 illustrates that there are two pressure regimes where time-varying fields can be established at sufficient field strength to affect the radial displacement of unstable ions; the first is at low pressures ($<10^{-2}$ torr, where existing 2- and 3-D quadrupole mass analyzers and traps are operated) and the second is at or near atmospheric pressure (760 torr, the present invention). The region marked forbidden at intermediate pressures is limited by gas discharge at the higher voltages required for quadrupole mass filtering. In addition, scattering effects from discrete collisions between ions and the surrounding gases deleteriously affect the motion of the ions in the intermediate pressure region as well.

Ion Mobility Spectrometry (IMS)

In recent years ion mobility spectrometry (IMS) has become an important analytical tool for measurement of ionized species created in a wide variety of atmospheric pressure ion sources; including but not limited to, discharge, $^{63}$Ni, and photo-ionization (Eiceman et al. (1994), Hill et al. (1990)). Recently, a number of researchers have also incorporated LC/MS sources, such as, electrospray (ES) and atmospheric pressure chemical ionization (APCI) into IMS (Wyttenbach et al. (1996), Wittmer et al. (1994), Covey et al. (1993), Guevremont et al. (1997)).

One recent non-conventional implementation of IMS (known as FAIMS, high-field asymmetric waveform ion mobility spectrometry) utilizes an asymmetric waveform to isolate ions between parallel plates or concentric tubes (Buryakov et al. (1993), U.S. Pat. No. 5,420,424 to Carnahan et al. (1995), Purves et al. (1999), W.O. patents 00/08456 (2000) and 00/08457 (2000) both to Guevremont et al., and commercialized by lonalytics, Corp. (Ottawa, Calif., http://www.ionalytics.com) as an LC/MS interface). This technique demonstrates the principal that we propose with the present invention, in that it utilizes a flow of gas along the z-axis coupled with alternating field conditions to create a bandpass spectrometer. Of particular note is the ability to produce field strengths of well over 10,000 volts per cm without discharge occurring. When coupled to ES and mass spectrometry FAIMS has served as an effective means of fractionation of various molecular weight regimes (Ells et al. (1999)).

Recent work by Miller and coworkers (U.S. Pat. Nos. 6,495,823 (2002), 6,512,224 (2003), 6,690,004 (2004), 6,806,463 (2004), 6,815,668 (2004) 6,815,669 (2004), 6,972,407 (2005); and U.S. patent application publications 2003/0132380 (2003) and 2004/0094704 (2004)) have introduced a miniaturized differential mobility device, microDMx™ (see SIONEX, Corp., Bedford, Mass., USA, http://www.sionex.com) and are now selling the device complete with electronics and as a component for incorporation into analytical devices, for example, gas chromatography-differential mobility detectors: CP-4900 by Varian, Inc. (Palo Alto, Calif., USA, http://www.varianinc.com) and EGIS Defender™ by Thermo, Inc. (Waltham, Mass., USA, http://www.thermo.com).

In a separate implementation of ion mobility, an ion mobility storage trap, both 2- and 3-dimensional traps, with asymmetric alternating current (AC) and variable direct current (DC) potentials has been proposed—for example, in the U.S. Pat. No. 6,124,592 to Sprangler (2000). Although these ion trapping devices may be able to trap ions, but once the ions are trapped ejecting the ions from the trap is very difficult due to lack of inertia of the ions at higher pressures, especially at, near, and above atmospheric pressure. These devices must rely on ions drifting very slowly out of the trap.

Our patent U.S. Pat. No. 6,784,424 B1 (2004) disclosed many of the same components of the present invention; however, the present invention distinguishes itself from our own prior art by disclosing improved ion sample introduction, alternative operating modes, and improved ion detection alternatives that yield better specificity and selectivity.

Nevertheless all the RF/DC mass filters or analyzers, linear and three-dimensional quadrupoles, IMS, FAIMS, and DMS heretofore known suffer from a number of disadvantages:

(a) Conventional quadrupole mass filters require the need for components, such as vacuum chambers, high-vacuum electrical feed-throughs, etc., that can withstand large pressure differences (–1,000 torr). This necessitates the need for stainless steel, aluminum, or other materials; chambers with vacuum tight welds; or metal or rubber seals that can withstand the large pressure difference.

(b) Conventional quadrupole mass filters require the need for expensive high vacuum pumps, such as turbomolecular or diffusion pumps; and low vacuum pumps, such as mechanical vane pumps; both costing several thousands of dollars. The cost of these pumps can makeup approximately 20% of the total cost of an instrument.

(c) Atmospheric interfaces for quadrupole mass filters require expensive high vacuum pumps for operation, resulting in costly and complex interface designs.

(d) Quadrupole mass filters weight several hundred pounds and require a substantial amount of electrical power for operation, heating and cooling, etc.; all restricting their portability.

(e) These all add to the manufacturing cost of quadrupole mass spectrometers and filters thereby resulting in a large percentage (–50%) of the cost of mass analyzers being due to the cost of the vacuum system components, including the vacuum pumps (both high and low vacuum), chamber, vacuum feed-throughs; atmospheric pressure interfaces; etc.

(f) FAIMS and other IMS analyzers lack the precision and band pass capabilities of quadrupolar designs or other multipole designs, by utilizing only 2 parallel plates instead of multiple poles. For example, in FAIMS and other asymmetrical RF devices, by utilizing asymmetric RF voltages between parallel plates these devices are forming only one-half of the fields seen in quadrupolar designs, therefore stopping short of the precision and band-pass capabilities of quadrupolar devices.

(g) 2- and 3-dimensional ion trapping devices while having the ability to trap ions with symmetric (and asymmetric) RF and DC potentials, lack sufficient axial forces to move ions from inside the device to the outside where they may be detected or samples through apertures or capillaries.

(h) All of these designs suffer from a very inefficient sampling of atmospheric gas-phase ions into the area between the parallel plates.

OBJECTS AND ADVANTAGES

Accordingly, besides the objects and advantages of the atmospheric quadrupole device described in our above patent, several objects and advantages of the present invention are:

(a) to provide a RF/DC mass and mobility analyzer with an axial flow of gas that can be produced from a variety of materials without requiring the need for materials and/or construction that can withstand large pressure difference;

(b) to provide a RF/DC mass and mobility analyzer with an axial flow of gas which does not require the use of high vacuum pumps;

(c) to provide a RF/DC mass and mobility analyzer with an axial flow of gas which does not require high vacuum pumps for atmospheric pressure ion-source interfacing;

(d) to provide a RF/DC mass and mobility analyzer with an axial flow of gas which is both lightweight and portable;

(e) to provide a RF/DC mass and mobility analyzer with an axial flow of gas which can be inexpensive to manufacture and easily mass produced;

(f) to provide a RF/DC mass and mobility analyzer with an axial flow of gas which can provide a precise band-pass capability;

(g) to provide a RD/DC mass and mobility analyzer with an axial flow of gas which can efficiently sample gas-phase ions at atmospheric pressure.

Further objects and advantages are to provide an atmospheric RF/DC mass analyzer with an axial flow of gas which can be composed of plastic and other easily molded materials; the electrodes (traditionally call rods) can be solid, tubes, make of perforated metal sheets or axially oriented wires; ion source can be an atmospheric pressure ionization source, such as but not limited to, atmospheric pressure chemical ionization, electrospray, photo-ionization; corona discharge, inductively coupled plasma source, etc.; and ion detector can be but not limited to an active pixel sensor array. Still further objects and advantages will become apparent for a consideration of the ensuing descriptions and drawings.

SUMMARY

In accordance with the present invention an atmospheric RF/DC mass and mobility analyzer comprises an atmospheric ion source, an ion-focusing region, an RF/DC quadrupole, an atmospheric gas-phase ion detector, and a source of gas which flows down the axis of the device.

REFERENCES

Buryakov, I. A., Krylov, E. V., Nazarov, E. G., Rasulev, U. Kh., "A new method of separation of multi-atomic ions by mobility at atmospheric pressure using a high-frequency amplitude-asymmetric strong electric filed," Int. J. Mass Spectom. Ion Processes. 128, pages 143-148 (1993).

Covey, T., Douglas, D. J., "Collision cross sections for protein ions," J. Am. Soc. Mass Spectrom. 4, pages 616-623 (1993).

Dawson, P. H., "Quadrupole Mass Spectrometry and Its Applications," Elsevier: New York (1976).

Dawson, P. H., "Chapter 2: Principals of operation," IN: Quadrupole Mass Spectrometry and Its Applications, Dawson, P. H. (ed.), pages 9-64, Elsevier: New York (1976).

Dawson, P. H., "Chapter 3: Analytical Theory," IN: Quadrupole Mass Spectrometry and Its Applications, Dawson, P. H. (ed.), pages 65-78, Elsevier: New York (1976).

Eiceman, G. A., Karpas, Z., "Ion Mobility Spectrometry," CRC Press: Boca Raton (1994).

Ells, B., Bameft, D. A., Froese, K., Purves, R. W., Hrudey, S., Guevremont, R., "Detection of chlorinated and brominated by products of drinking water disinfection using electrospray ionization-high-field asymmetric waveform ion mobility spectrometry-mass spectrometry," R., Anal. Chem. 71, pages 4747-4752 (1999).

Guevremont, R., Siu, K. W. M., Ding, L., "Ion mobility/TOF mass spectrometric investigation of ions formed by electrospray of proteins," Proceedings of the 45$^{th}$ ASMS Conference on Mass Spectrometry and Allied Topics, page 374, Palm Springs, Calif., Jun. 1-5, 1997.

Guevremont, R, Purves, R., Barrett, D., "Method for Separation and Enrichment of Isotopes in gaseous Phase," WO Patent 00/08456 (Feb. 17, 2000). Guevremont, R, Purves, R., "Apparatus and Method for Atmospheric Pressure 3-Dimensional Ion Trapping," WO Patent 00/08457 (Feb. 17, 2000). Purves, R., Guevremont, R, "Electrospray ionization high-field asymmetric waveform ion mobility spectrometry-mass spectrometry," Anal. Chem. 71, pages 2346-2357 (1999).

Hill, H. H., Siems, W. F., St. Louis, R. H., McMinn, D. G, "Ion mobility spectrometry," Anal. Chem. 62, pages 1201A-1209A (1990).

Gerlich, D., "Inhomogeneous RF fields: A vsersatile tool for the study of processes with slow ions," IN: State-Selected and State-To-State Ion-Molecule Reaction Dynamics. Part 1. Experiments, Ng, C-Y, Baer, M. (eds.), pages 1-176, John Wiley & Sons: New York (1992).

Johnson, J. V., Pedder, R. E., Yost, R. A. "The stretched quadrupole ion trap: implications for the Mathieu $a_u$ and $q_u$ parameters and experimental mapping of the stability diagram," Rapid Commun. Mass Spectrom. 6, pages 760-764 (1992).

Miller P. E., Denton, M. B., "The quadrupole mass filter: Basic operating concepts," J. Chem. Ed. 63, pages 617-622 (1986).

Paul, W., Steinwedel, H., "Mass spectrometer without magnetic field," Z. Naturforsch, 8a, pages 448-450 (1953).

Stafford, G. C., Kelly, P. E., Stephens, D. R., "Method of Mass Analyzing a Sample by Use of a Quadrupole Ion Trap", U.S. Pat. No. 4,540,884 (Sep. 10, 1985).

Steel, C., Henchman, M., "Understanding the quadrupole mass filter through computer simulation," J. Chem. Ed. 75, pages 1049-1054 (1998).

Thomson, B. A., Douglas, D. J., Corr, J. J., Hager, J. W., Jolliffe, C. L., "Improved collisionally activated dissociation efficiency and mass resolution on a triple quadrupole mass spectrometer," J. Am. Soc. Mass Spectrom. 6, pages 1696-1704 (1995).

Titov, V. V., "Detailed study of the quadrupole mass analyzer operating within the first, second, and third, (intermediate) stability regions. I. Analytical approach," J. Am. Soc. Mass Spectrom 9, pages 50-69 (1998).

Wittmer, D., Chen. Y. H., Luckenbill, B. K, Hill, H. H., "Electrospray ionization ion mobility spectrometry," Anal. Chem. 66, pages 2348-2355 (1994).

Wyttenbach, T., von Helden, G., Bowers, M. T., "Gas-phase conformation of biological molecules: Bradykinin," J. Am. Chem. Soc. 118, pages 8335-8364 (1996).

FIGURES

In the drawings, closely related figures have the same number but different alphabetic suffixes.

FIG. 1 (Prior Art). Rod assembly and polarity configuration for a conventional (vacuum) quadrupole. The applied potentials, variable in time t and at frequency Ω, showing both the DC component $V_{dc}$; and the alternating component $V_{rf}$. $V_{ion\ energy}$ is a fixed DC potential on the rods (commonly referred to as pole bias) that determine the energy of the ion in the z-direction.

FIG. 2A (Prior Art). Bandpass Region: x, y-stability regions for a given mass in a quadrupole mass filter, with axis label with rf and dc functions rather than traditional a and q values. The overlap indicates the bandpass region.

FIG. 2B (Prior Art). Scanning the Mass Range: the bandpass region of the stability diagram for three masses ($M_1$, $M_2$, and $M_3$) indicating how one mass is resolved from another through rejection of adjacent masses due to instabilities.

FIG. 3 Applied voltage of the RF ($V_{rf}$)(peak-to-peak) versus observed discharge limit as a function of pressure. Both conventional (vacuum) and atmospheric pressure-operating regimes are shown.

FIG. 4 represents the geometry of the potential surface in the x-y plane within a quadrupole device for operation in the DC mode. Motion of ions in DC fields tend to follow the electric field lines (moving perpendicular to the equipotential lines) at atmospheric pressure. Ions introduced near the rods (top-of-the-saddle) are directed downhill into the pseudo-potential well. While ions in the pseudo-potential well are directed downhill into the rods.

FIG. 5 represents the geometry of the potential surface in the x-y plane within a quadrupole device operating in the RF mode. Motion of ions in RF fields oscillate about a fixed point with little if any motion towards or away from the rods. Little inertial focusing occurs at atmospheric pressure because most of the inertial energy is dissipated through random collisions within a few collisions.

FIGS. 6A and 6B are cross-sectional representations of the essential features of the atmospheric RF/DC mass and mobility analyzer, depicting a quadrupole device, with an ion source, an ion focusing region at the entrance of the quadrupole RF/DC filter (for introducing ions at the top-of-the-saddle), sample and carrier gas inlets, a gas exhaust, and a detector region at the exit of the quadrupole device with a tubular faraday detector on-axis with the quadrupoles to sample ions from the field-free axis. FIG. 6B is enlarged view of the Focusing and Quadrupole Regions.

FIG. 7 is a cross-sectional representation of the essential features of a similar atmospheric RF/DC mass and mobility analyzer, depicting the quadrupole device, with the ion source, the ion focusing region at the entrance of the quadrupole RF/DC filter (for introducing ions at the top-of-the-saddle), the sample and carrier gas inlets, the gas exhaust, and the detector region at the exit of the quadrupole device with a tubular conductance pathway leading into a low pressure chamber occupied by a mass spectrometer.

Figure 9A:
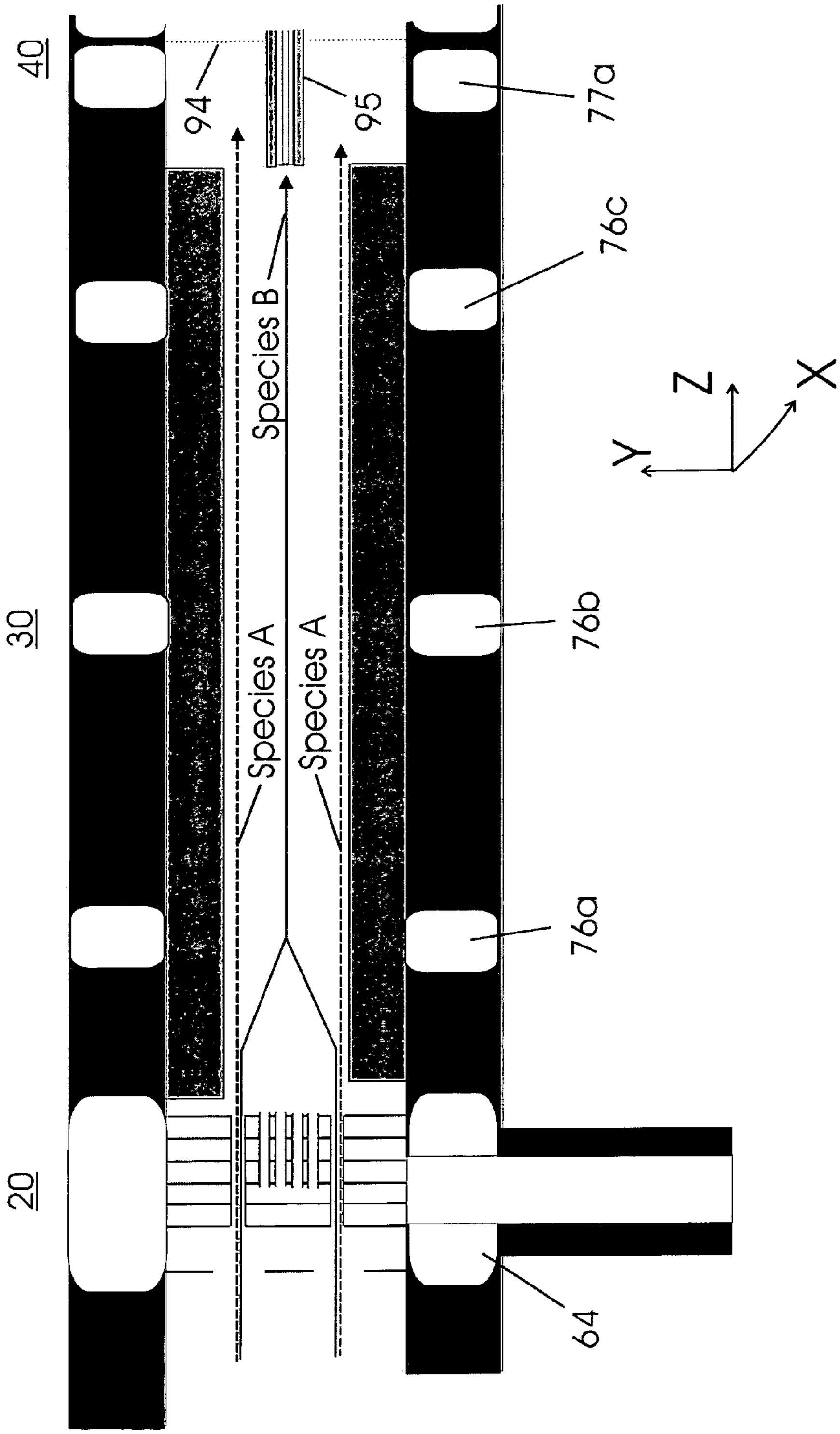
FIG. 9A is a cross-sectional schematic representation of a similar atmospheric RF/DC mass and mobility analyzer operating as a low-pass filter with top-of-the-saddle sample introduction and DC collection of low-passed ions (Species B) on-axis of with the quadrupole; for the removal of particles (Species A).
Figure 9B:
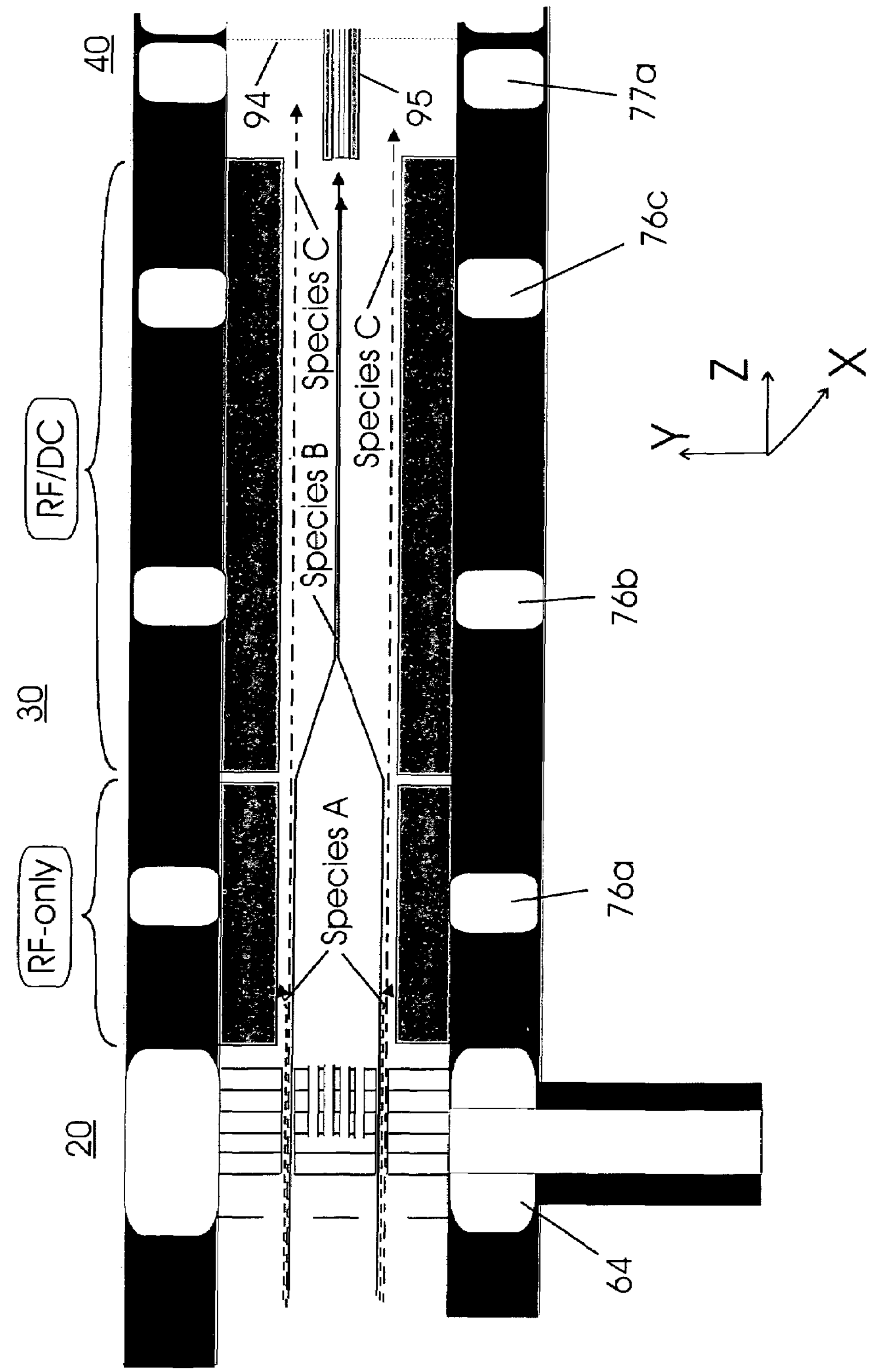

FIG. 9B is a cross-sectional schematic representation of a similar atmospheric RF/DC mass and mobility analyzer comprised of RF-only pre-quadrupoles and RF/DC quadrupoles, operating as a band-pass filter. Note the trajectories of low mass or high mobility ions (Species A) resulting in these ions colliding with the rods in the RF-only region. Ions of appropriate mobility (Species B) are directed towards the axis of the quadrupole in the RF/DC region, primarily under the influence of net DC fields and passed through the analyzer. While high molecular weight ions or particles (low mobility components, Species C) pass through the analyzer without being directed into the axis of flow.

Figure 10:
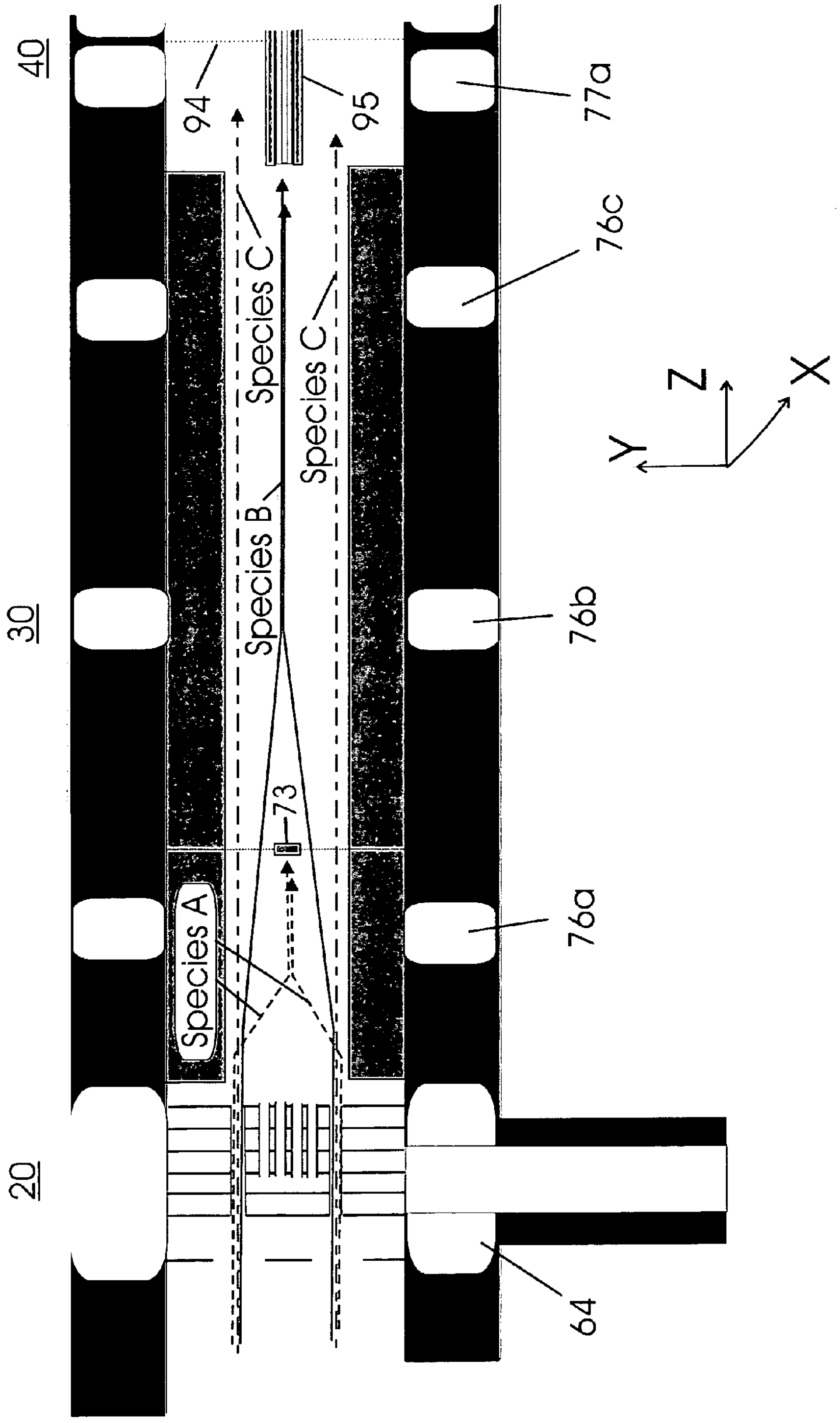

FIG. 10 is a cross-sectional schematic representation of a similar atmospheric RF/DC mass and mobility analyzer operating as a band-pass filter with a physical stop on-axis to stop or prevent ions of a specific mobility (in this case Species A) from passing through the analyzer. The mobility of Species C is less than Species B while the mobility of Species B less than Species A.

Figure 11A:
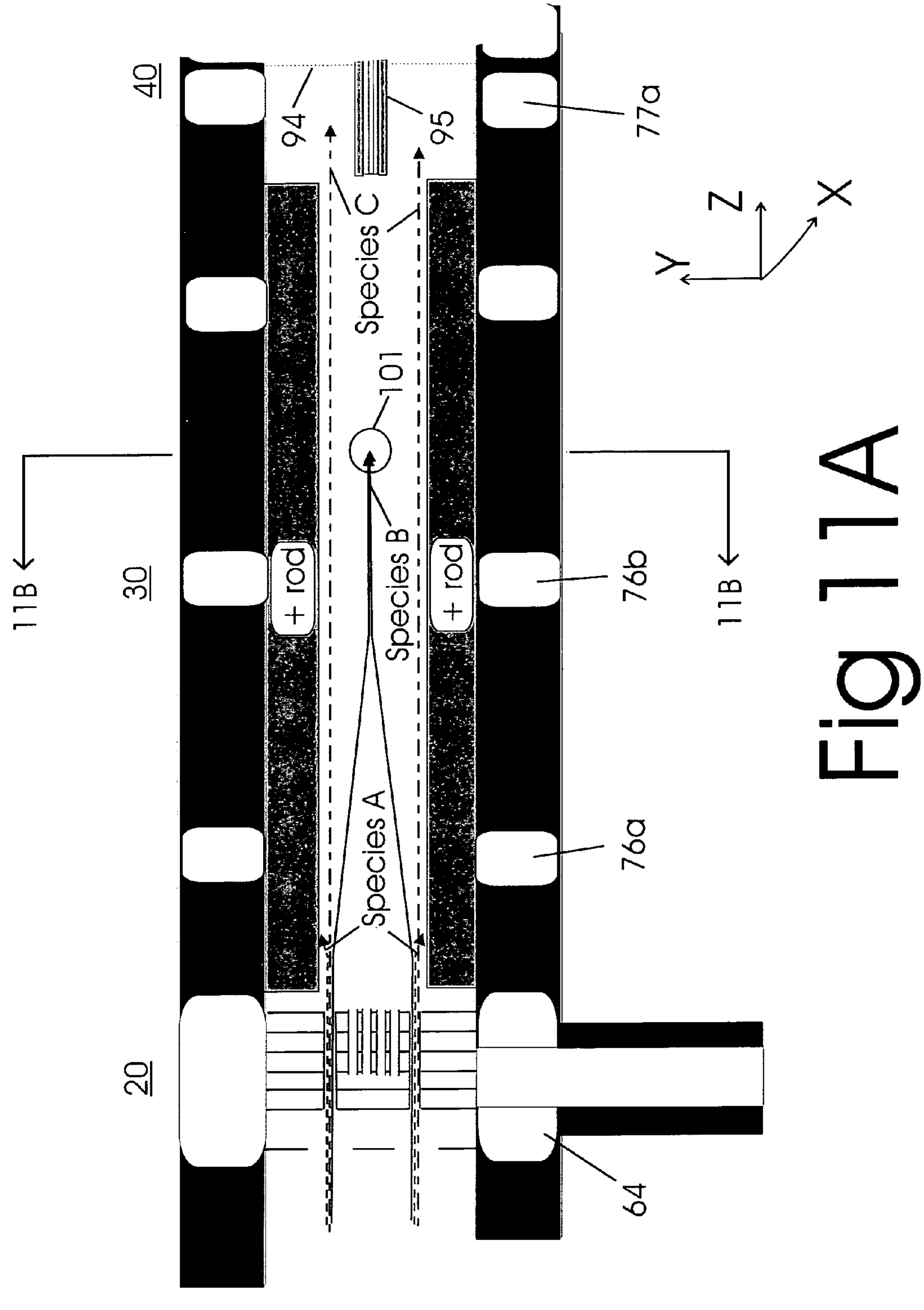
Figure 11B:
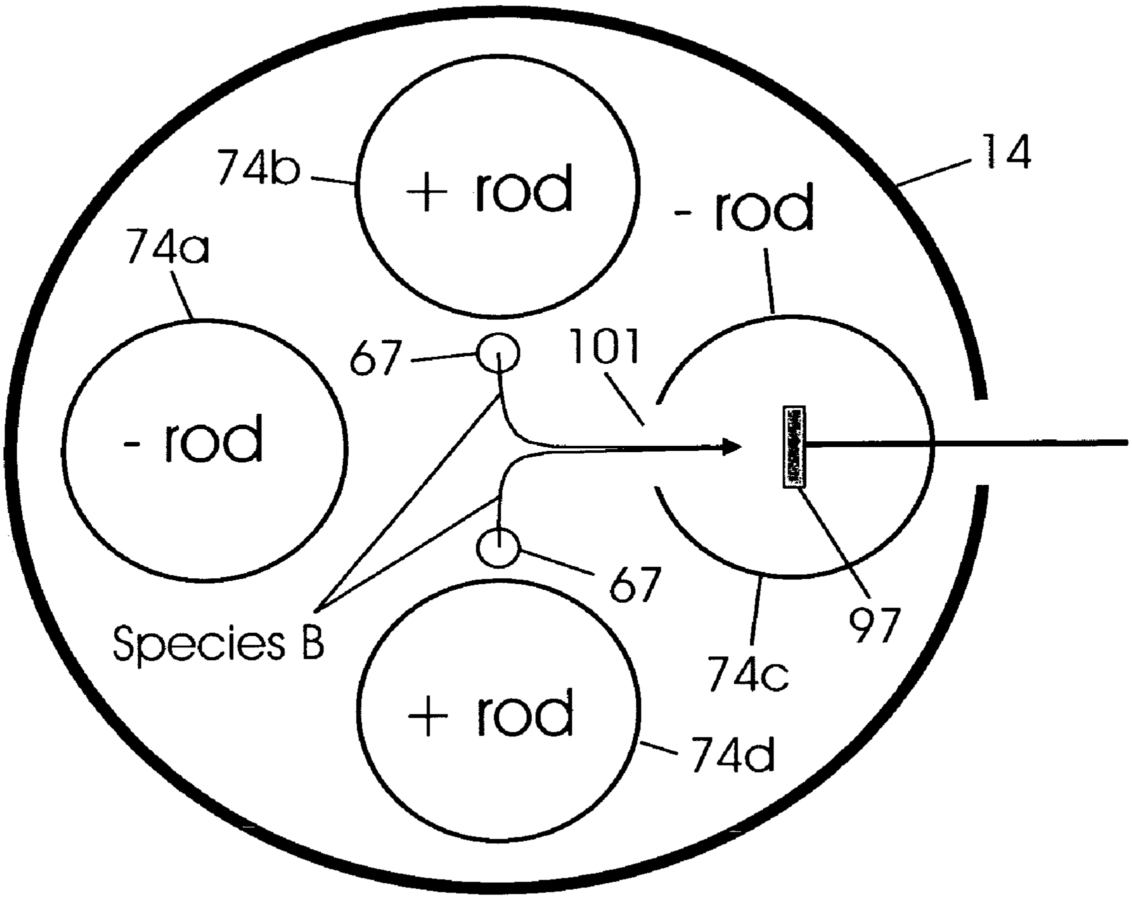

FIGS. 11A to 11B are a cross-sectional schematic representations of a similar atmospheric RF/DC mass and mobility analyzer with off-axis detection of unstable ions (Species B) sampled through the rods as an alternative to axial sampling. FIG. 11B is a cross-sectional slice along the plane at the opening in the rod looking down the assembly from the detector region, shows the motion of positive ions (Species B) from the top-of-the-saddle, through an opening in the rod (at negative potential) continuing through the central axis of the rod, and finally impacting onto the detector.

Figure 12A:
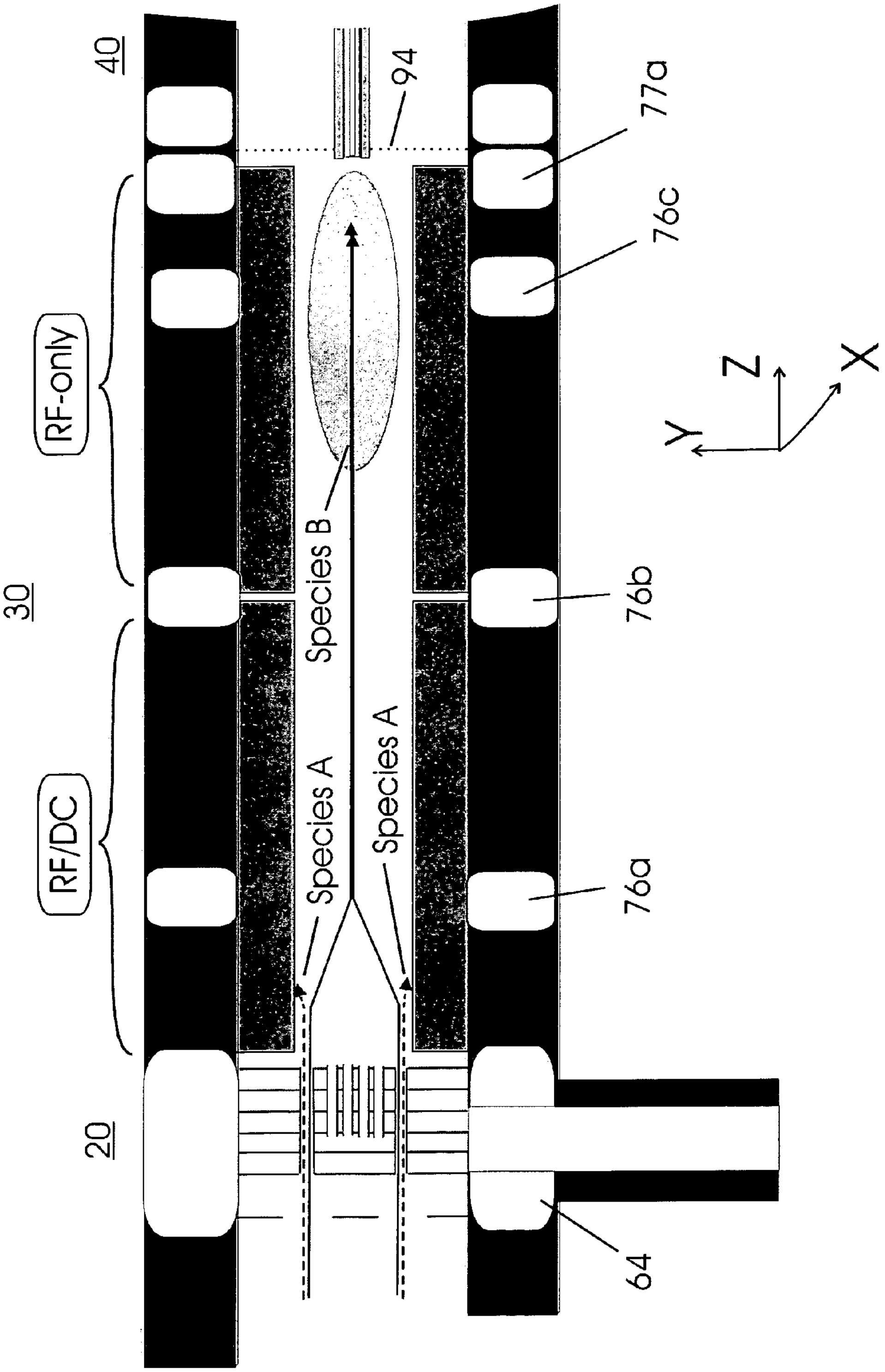
Figure 12B:
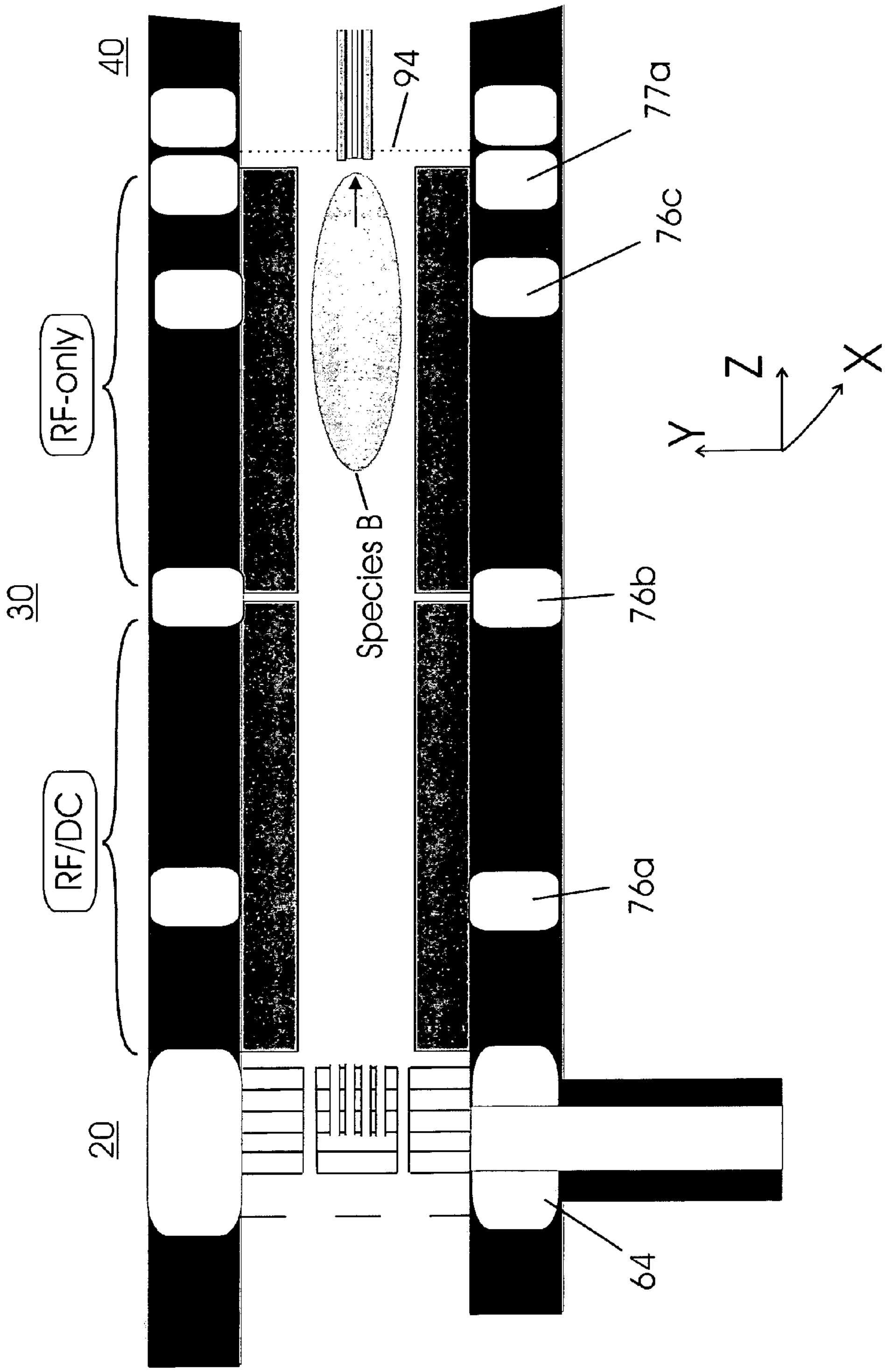

FIGS. 12A and 12B are schematic representations of a similar atmospheric RF/DC mass and mobility analyzer, comprised of two sets of quadrupole assemblies in series operating as an ion trap. FIG. 12A showing the focusing and accumulation of Species B in the RF-only quadrupole assembly, while FIG. 12B shows the release and detection of the trapped ions.

Figure 1:
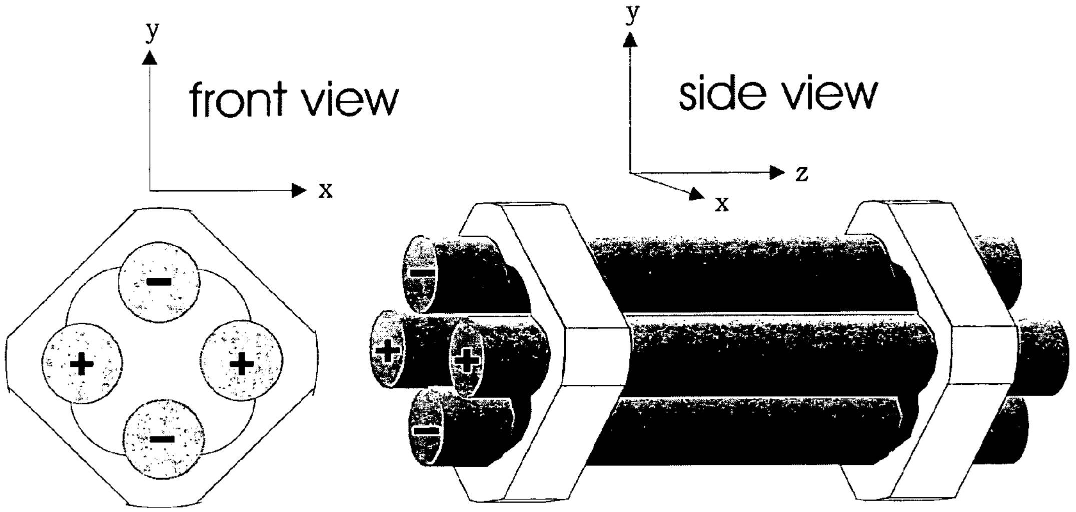
Figure 2A:
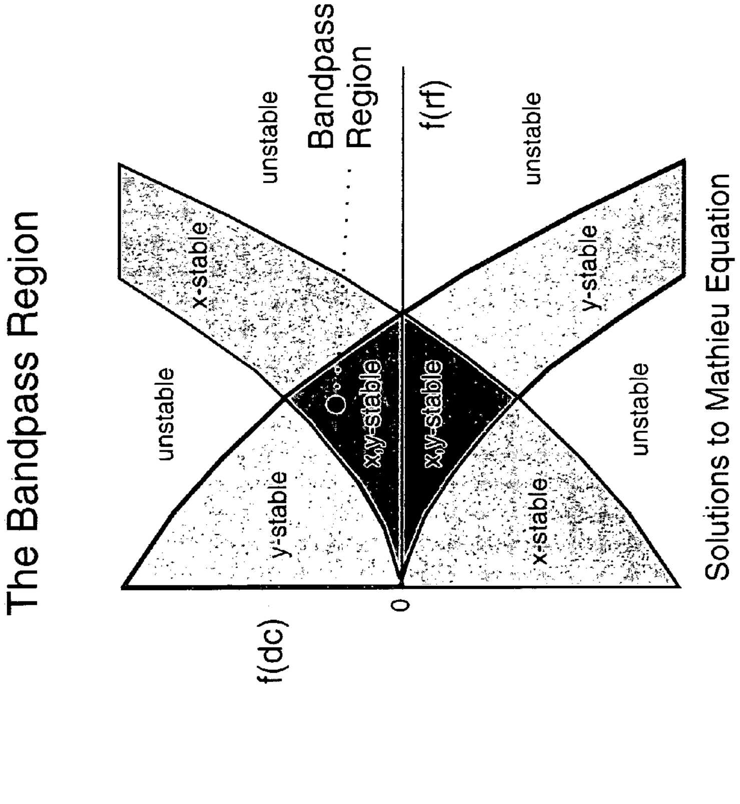
Figure 2B:
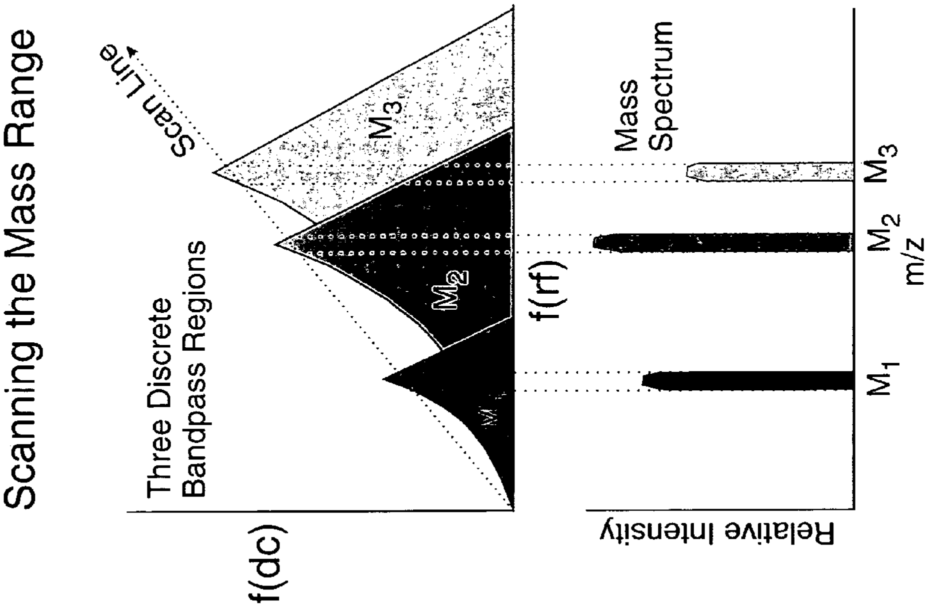
Figure 3:
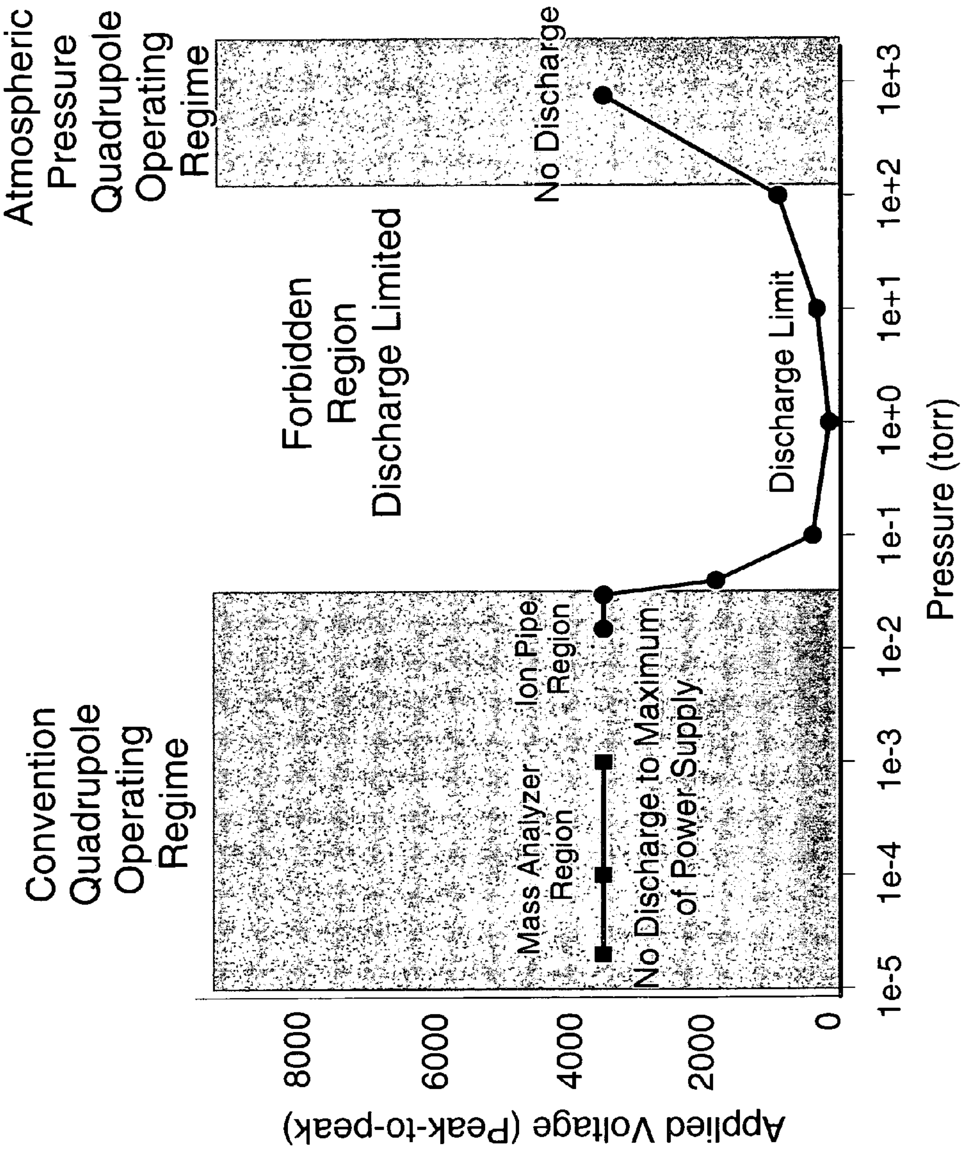
Figure 13:
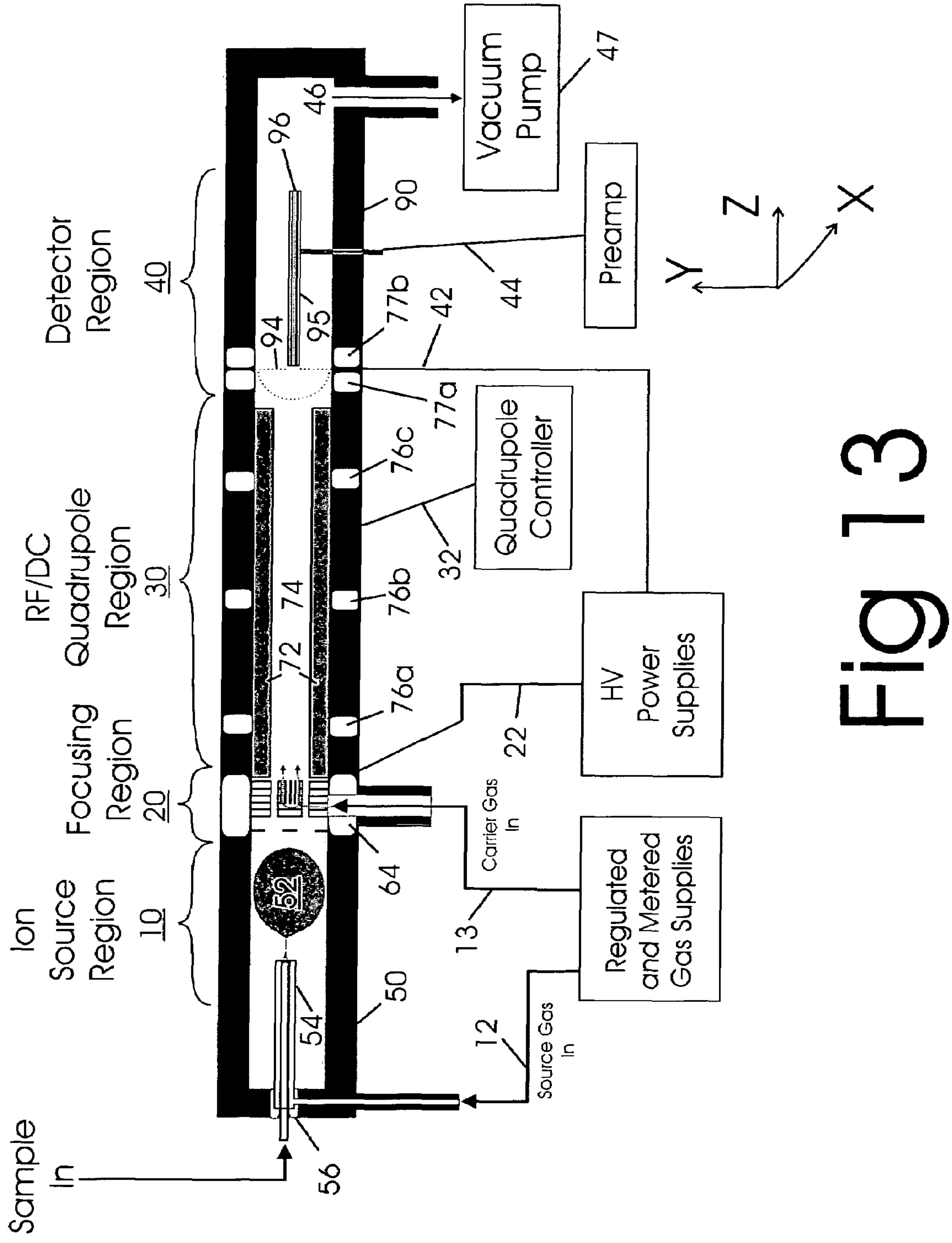

FIG. 13 is a representation of the essential features of a RF/DC mass and mobility analyzer operated below atmospheric pressure depicting a quadrupole device, with an atmospheric or near atmospheric pressure ion source, a top-of-the-saddle ion focusing region at the entrance of a low pressure quadrupole RF/DC filter; sample and carrier gas inlets; a low pressure detector region at the exit of the quadrupole RF/DC filter comprised of a hemispherical high-transmission element for collecting and focusing ions into or onto an ion detection apparatus; and a vacuum exhaust for maintaining the RF/DC filter and detector region below atmospheric pressure but still operating in the viscous flow regime; and below the discharge boundaries as prescribed by the boundaries of the Paschen curve (see FIG. 3).

REFERENCE NUMBERS IN DRAWINGS

10 Ion Source Region
12 Gas inlet
13 gas inlet
14 cylindrical electrically conductive analyzer housing
20 Focusing Region
22 electrical lead
30 Quadrupole Region
32 electric lead
40 Detector Region
42 electrical lead
44 electrical lead
46 gas-exhaust port
47 vacuum pump
50 conductive electrospray ionization chamber
52 ionization region
54 electrospray needle
56 insulator
60 laminated high-transmission element
64 insulator
65 entrance lens
66 entrance apertures
67 slotted or tubular openings
68 axial gas inlet tubes
72 atmospheric or near atmospheric RF/DC quadrupole filter or assembly
73 axial stop
74 individual primary electrodes
76 insulator
77 insulator
90 housing
94 exit lens
95 detector insulator
96 ion detector
97 off-axis detector
98 ion exit opening
99 conductance tube
101 opening
180 region

DETAILED DESCRIPTION

Preferred Embodiment—FIGS. 6A, 6B, 7, 8, 9A, and 9B (Basic Focusing Device, On-Axis Detection)

Figure 6A:
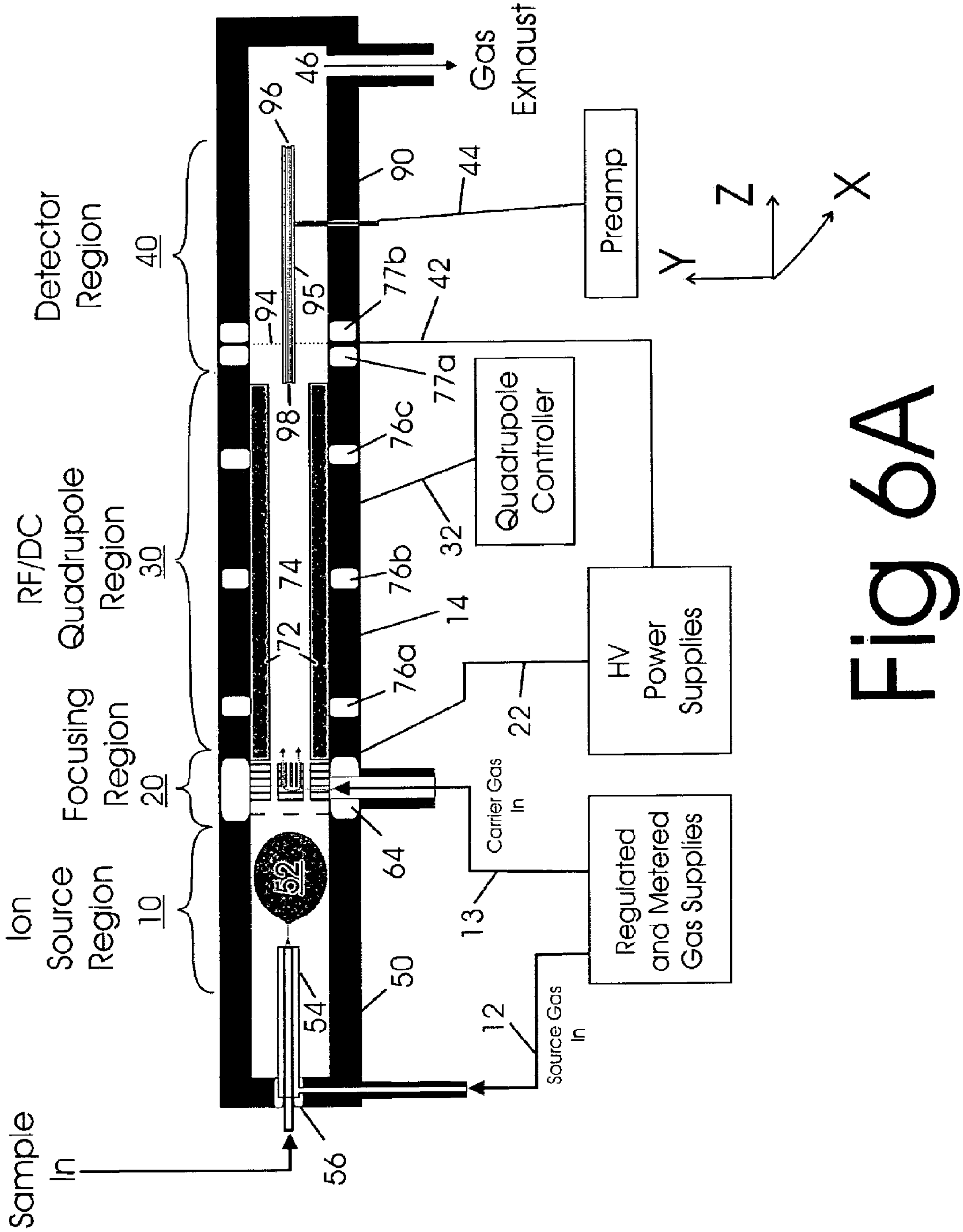
Figure 6B:
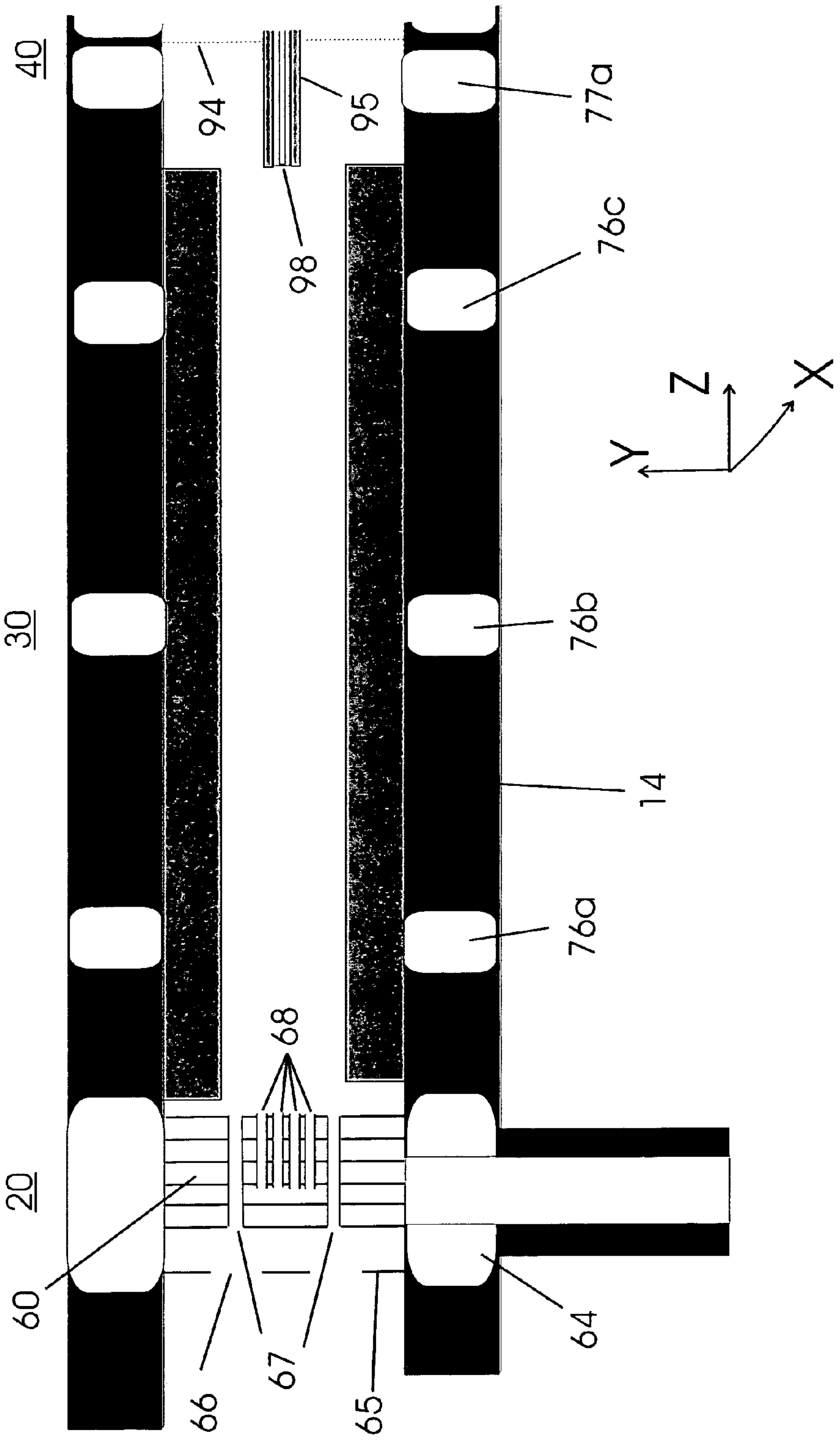

A preferred embodiment of the atmospheric RF/DC device of the present invention is illustrated in FIGS. 6A and 6B. Basic parts include an Ion Source Region 10, Focusing Region 20, RF/DC Quadrupole Region 30, and Detector Region 40. The Ion Source Region 10 is mounted at one end of the cylindrical electrically conductive analyzer housing 14 and is symmetrically disposed about the central axis Z. The ion source may comprise, for example, a conductive electrospray ionization chamber 50 comprised of an ionization region 52, an electrospray needle 54, an insulator 56, and a gas inlet 12. A carrier gas is supplied upstream of the Ion Source Region 10 through the gas inlet 12 from the regulated and metered gas supply source. The gas is generally composed of, but not limited to nitrogen.

This device is intended for use in collection and focusing of ions from a wide variety of ion sources at atmospheric or near atmospheric pressure; including, but not limited to electrospray, atmospheric pressure chemical ionization, photo-ionization, electron ionization, laser desorption (including matrix assisted), inductively coupled plasma, and discharge ionization. Both gas-phase ions and charged particles emanating from the Ion Source Region 10 are collected and focused with this device. Samples can be derived directly from gases or from surfaces at or near atmospheric pressure. Samples may also emanate from flow streams of liquid, gas, or aerosols and have any number of conditioning or selectivity steps before entering the present device.

A laminated high-transmission element or lens 60 is positioned symmetrically about the Z-axis adjacent to an atmospheric or near atmospheric RF/DC quadrupole filter or assembly 72 and downstream of the Ion Source Region 10, in the Focusing Region 20. The laminated high-transmission element 60 is comprised of an entrance lens 65 and two slotted or tubular openings 67 directing ions into the top-of-the-saddle (near the rods). Element 60 is electrically isolated from the housing 14 and RF/DC quadrupole assembly 72 by insulator 64. The two tubular openings 67 of the laminated lens defines entrance apertures 66. Electric lead 22 schematically depict the connections required to operate the high-transmission element 60 and entrance lens 65. Additional gases can be added to the analyzer through axial gas inlet tubes 68, the gas being delivered through inlet 13 from the Regulated and Metered Gas Supply.

Downstream of the Focusing Region 20 is the Quadrupole Region 30, which contains the atmospheric RF/DC quadrupole filter assembly 72. Individual primary electrodes 74 in assembly 72 are held in place and electrically isolated from the cylindrical electrically conductive housing 14 by a series of insulators 76*a*, 76*b*, 76*c*. The primary electrodes 74 are in the form of cylindrical conducting rods or poles extending parallel to one another and disposed symmetrically about the central axis. The X rods lie with their centers in the X-Y plane, and the Y rods lie with their centers on the Y-Z plane. Electric lead 32 schematically depict the connections required to operate the quadrupole filter. The four rods 74 in standard positive and negative polarity sets are held in an equally spaced position and equal radial distance from the centerline by attachment to insulators 76*a*, 76*b*, 76*c*.

An exit lens 94 is located downstream of the Quadrupole Region 30, in the Ion Detector Region 40, while a housing 90 encloses the Ion Detector Region 40. Electric lead 42 schematically depict the connections required to operate the exit lens 94. A series of insulator 77*a*, 77*b* isolates lens 94 from the housing 90. An ion detector 96 with an ion exit opening 98, such as a faraday plate, cup, or tube, or a tessellated array detector is symbolically provided with electrical leads 44, and may be conveniently mounted on the exit lens 94 with detector insulator 95 isolating the exit lens 94 from the ion detector 96. In addition, a gas-exhaust port 46 is located at the end of the housing 90; downstream of the detector 96.

Figure 7:
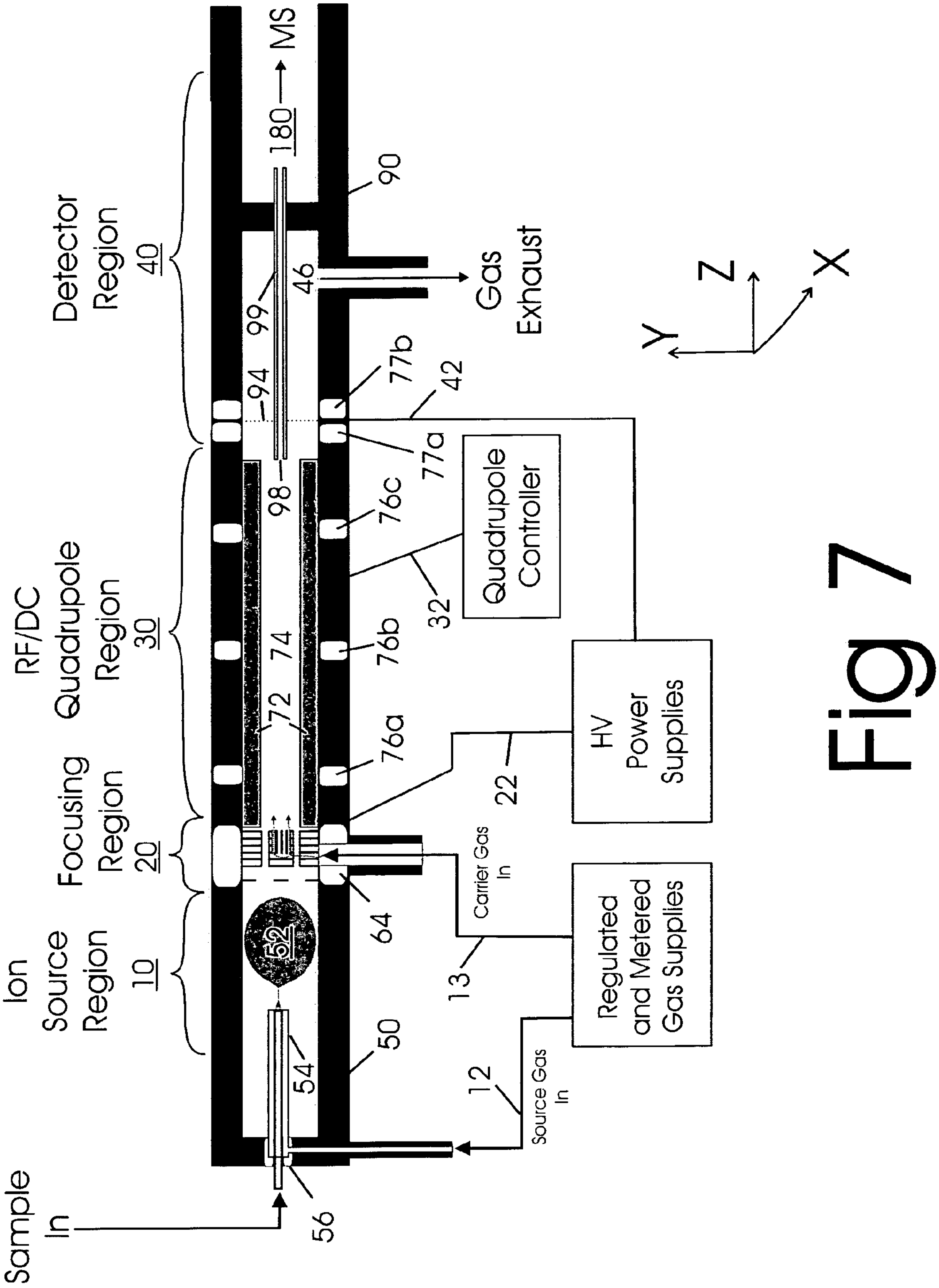

In FIG. 7 the RF/DC atmospheric focusing device shows a conductance tube 99 for an atmospheric interface to a mass spectrometer mounted in the Detector Region 40 symmetrically disposed about the central Z-axis. Tube 99 has a diameter appropriate to restrict the flow of gas from the Ion Detector Region 40, at or near atmospheric pressure, into region 180. In the case of utilizing a mass spectrometer in region 180 for analysis and detection, typical aperture diameters of 100 to 500 micrometers of the ion exit opening 98 are generally required to maintain the mass spectrometer at low pressures. Alternatively, the conductance tube can be replaced by an array of tubes or apertures as described in our U.S. Pat. No. 6,878,930 (2005).

Additional Embodiment—(FIG. 10) On-Axis Detection with an Axial Stop.

An additional embodiment is shown in FIG. 10. An axial stop 73 is placed within the RF/DC quadrupole assembly 72 for removal of ions that have been focused into the center of the assembly.

Alternative Preferred Embodiment—(FIGS. 11A and 11B) Off-Axis Detection.

An alternative configuration is to place a detector electrode 97 off-axis from the flow of gas behind or within a particular rod 74. Ions that are unstable under the influence of the DC fields are directed at the appropriate polarity rod so that the ions will travel through an aperture or opening 101 in the rod and be detected by the off-axis detector 97. Multiple discrete detectors 97 (along with accompanying apertures or openings 101) can be place at specific locations along the rod to simultaneously detect specific analytes under fixed voltage conditions, or a single detector can detect multiple analytes by scanning RF and DC voltages. The off-axis mode of sample collection can alternatively serve as a means to select ions through a conductance tube or opening into vacuum with the conductance opening location at an appropriate position off-axis for subsequent mass spectrometric analysis.

Alternative Preferred Embodiment—(FIGS. 12A and 12B) Trapping Mode

An alternative configuration is to place the exit lens 94 in a position to retard the motion of ions downstream at the exit of the RF/DC Quadrupole Region 30. This mode of operation will serve to trap ions in the pseudo-potential well, particularly if the downstream quadrupole assembly 72 is operated in RF-only mode.

Alternative Preferred Embodiments—(FIG. 13) Lower Pressure Mode

An alternative configuration is to place a vacuum pump 47 on the exhaust of the Detector Region 40 to enable reduction of pressure in the RF/DC Quadrupole Region 30 relative to the Ion Source 10 and Focusing 20 Regions. The lower pressure allows a higher degree of inertial focusing and better selectivity in the RF/DC Quadrupole Region 30. Care has to be taken not to reduce pressure to the point where discharge occurs (See FIG. 3). This mode may require only inexpensive pumps.

Alternative Embodiments—(Shapes, Multi-poles, Monopoles, and Manufacturing)

There are various possibilities with regard to the shape and number of poles 74 of the RF/DC atmospheric filter 72, including hexapoles and octapoles. In addition, each electrical element or electrode 74 can be fabricated from solid metal stock, extruded and coated, formed from sheer stock (solid or perforated), or define by axially aligned wires to minimize turbulence. Alternatively, assembly 72 may be manufactured by using the techniques of microelectronics fabrication: photolithography for creating patterns, etching for removing material, and deposition for coating the surfaces with specific materials; or combinations of macro and microelectronic techniques.

Operation of the Basic Device (As Shown in FIGS. 4 thru 10)

The manner of the using the RF/DC atmospheric mass and mobility analyzer with an axial flow of gas to collect, focus, and separate ions based on their mobility is as follows. Ions supplied or generated in the Ion Source Region 10 from the electrospray source are attracted to the laminated high-transmission element 60 by an electrical potential difference between the Ion Source Region 10 and the potential on element 60. The ions will tend to follow the electrical field lines through the Ion Source Region 10, pass through the entrance lens 62, traverse the element 60, enter the entrance apertures 66, and be direct through laminated openings 67. Such means are described and illustrated in our U.S. Pat. Nos. 6,818,889 (2004), 6,878,930 (2005), and 6,643,347 (2005); and U.S. patent applications Ser. Nos. 10/862,304 (2004), 10/989,821 (2004), and 11/173,377 (2005). In addition a sweep gas is also added into the Ion Source Region 10. The combination of the potential difference and the flow of the sweep gases cause the ions, as they exit the laminated lens, to be focused at or near a small cross-sectional area at the entrance to the Quadrupole Region 30, near an individual rod 74 (at the-top-of-the saddle).

As the ions or charged particles are swept into the Quadrupole Region 30 the RF or RF and DC potentials effectively select the ions of specific mobilities into the pseudo-potential well preventing their dispersion in the radial (X-Y) plane. While their movement along the longitudinal z-axis is driven by the gas flow supplied from the Ion Source Region 10 and the axial gas inlet tubes 68. RF and DC potentials can be selected to select specific ions or a range of ions that are stable within the quadrupole assembly 72. At the appropriate RF and DC ratios ions that are not stable will drift off the central axis and eventually collide with the rods (Species A in FIGS. 8 and 9B) or pass through the filter without falling into the pseudo-potential well (as shown by Species A in FIG. 9A and Species C in FIG. 9B). The ions that remain in the center or fall into the center (Species B in FIGS. 8, 9A, and 9B) are swept out of the quadrupole cylinder exiting into the ion exit opening 98.

Figure 4:
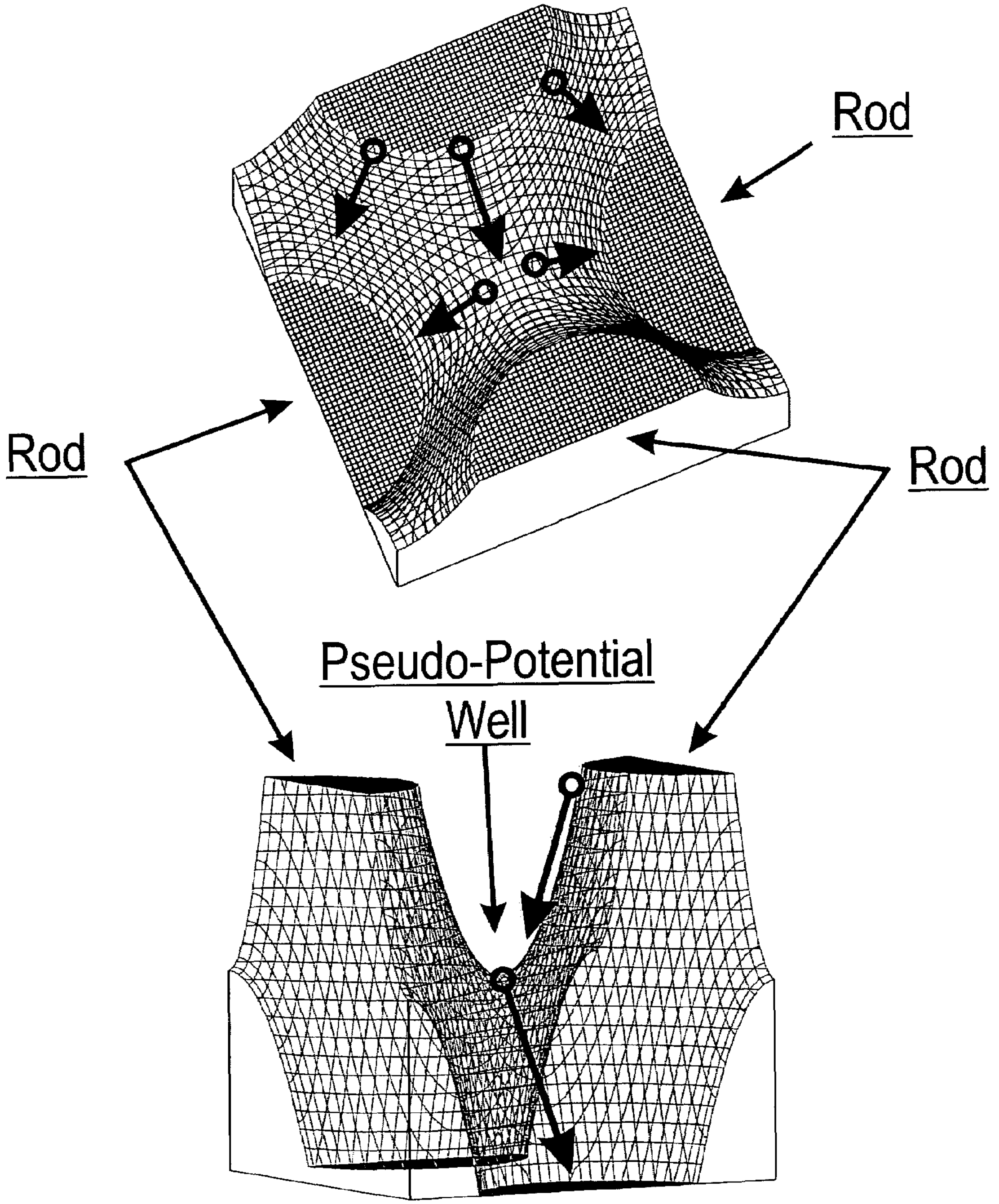

FIG. 4 illustrates the motion of ions under the influence of DC fields in the Quadruple Region 30. The X-Y potential surface shows the saddle-shaped geometry from the opposite polarity sets of quadrupole rods. In order for ions of specific mobility to be effectively collected in the potential well of the quadrupolar field, the ions must be introduced at the top-of-the-saddle where electric fields are highest and the mobility is greatest. This is the key operating condition of the present device. Also, the cross-section of ions being introduced into the quadrupolar fields should be small relative to the dimensions of the rods. The ions will follow the electric fields from the top-of-the-saddle to the axis of the quadrupole assembly 72.

Figure 5:
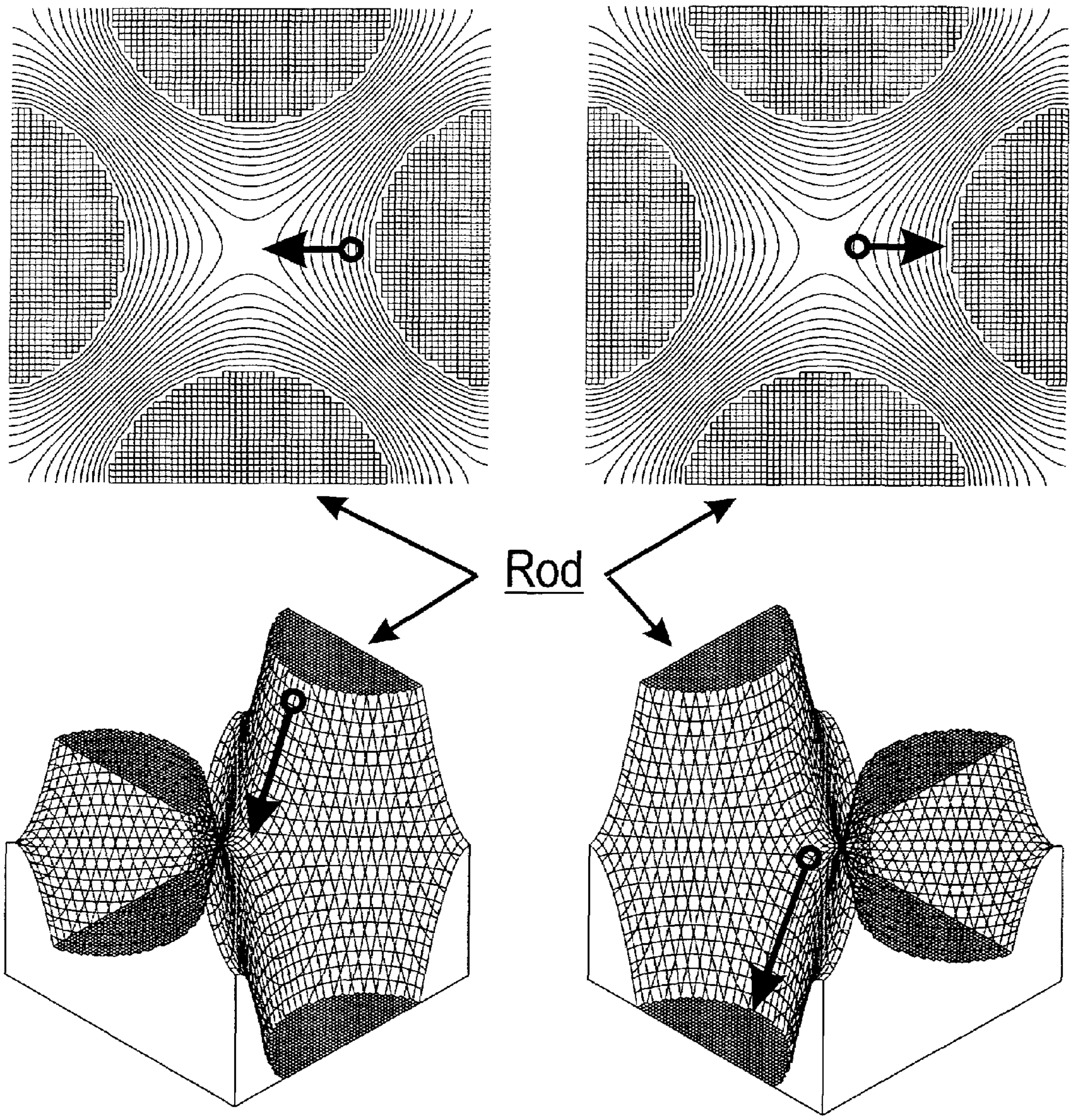

FIG. 5 illustrates the motion of ions under the influence of RF fields in the Quadruple Region 30. Because the inertia of ions from electric fields is minimized at atmospheric pressure due to randomization from collisions, the focusing of ions in RF is minimized as well; ions can oscillate towards then away from the electrodes. We can utilize RF fields to remove ions from the stream if the amplitude of the RF induced motion extends to the rods where ions can collide with rods and be neutralize. Higher mobility or lower mass ions (Specie A in FIGS. 8 and 9B) with large amplitudes can be lose at the rod boundary when ions are introduced near the rod as shown with the present invention. Higher mass (or lower mobility) ions (Specie A in FIG. 9A, Specie C in FIGS. 9B, 10, and 11A) will pass downstream and through the quadrupole assembly, only focused by DC fields. We envision that the present invention will operate with both RF and DC fields to affect the desired operating performance. In its simplest mode of operation, the present device doses not require RF fields, only DC.

Figure 8:
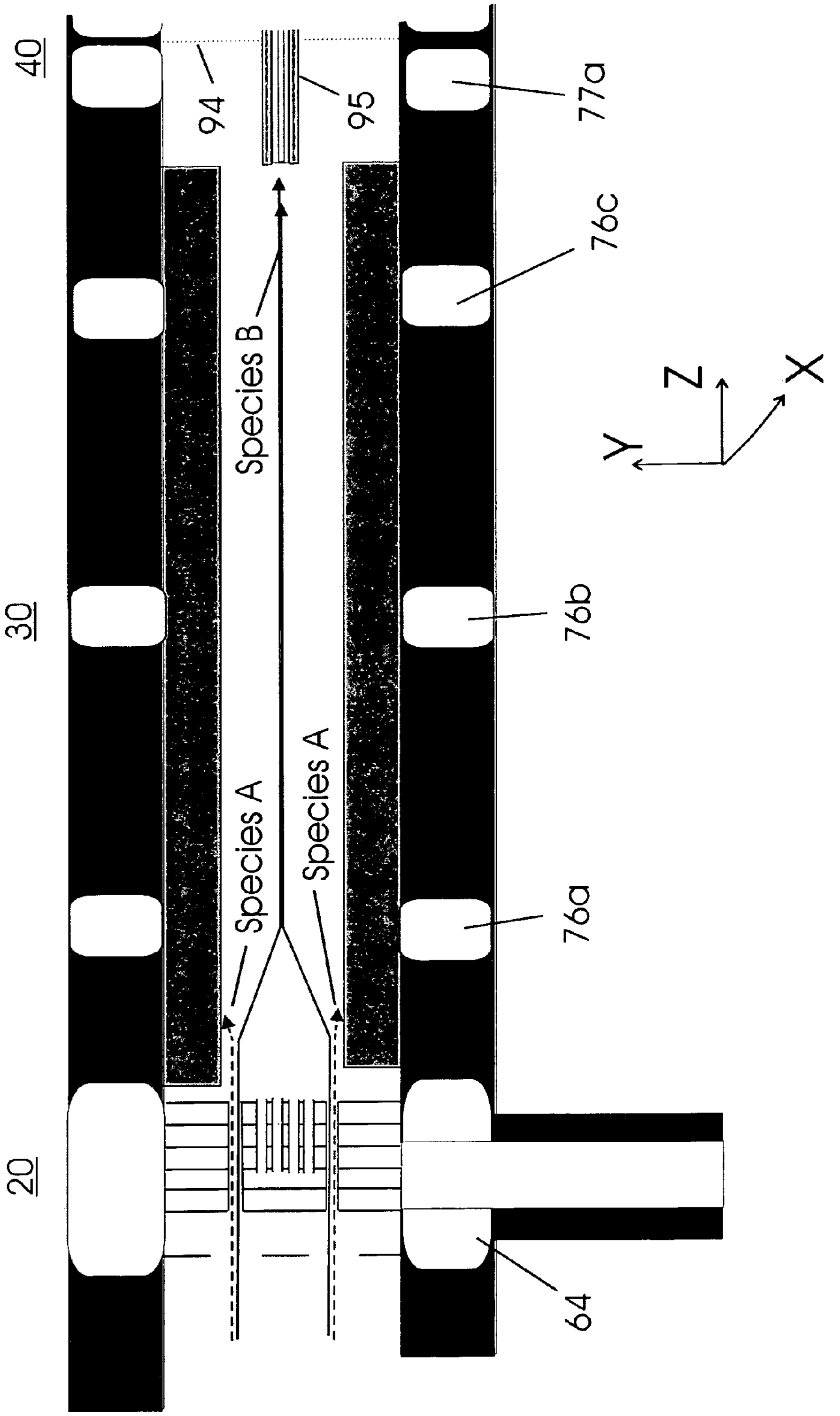
FIG. 8 is a cross-sectional schematic representation of a similar atmospheric RF/DC mass and mobility analyzer operating as a high-pass filter with top-of-the-saddle sample introduction and collection of high-passed ions (Species B) on-axis with the quadrupole; for the removal of excess low mass reagent ions (Species A).

FIG. 8 illustrates one mode of operation where high mobility ions (Species A) are lost due to RF displacement into the rods at the entrance to the quadrupole assembly while lower mobility (higher mass, Species B) species are focused in DC fields to the axis of the quadrupole assembly and transported to the axial detector 96 or conductance tube 99 (FIG. 7). Note the sampling into a conductance tube from the axis of the quadrupole assembly minimizes rim loses associated with sampling from higher electric fields. This device operates as a "high-pass filter" and has an important operational utility of removing low mass reagent ions before conductance openings (ion exit opening 98) resulting in minimizing the effects of space charge at openings at higher currents.

FIG. 9A illustrates the "low-pass filter" mode of operation where high mass species (low mobility species, Species A) are removed by virtue of the lack of radial displacement in the gas flow while lower mass species (higher mobility species, Specie B) fall into the pseudo-potential well and are samples on-axis. This operational mode has the utility to remove particles, charged or uncharged, while effectively transmitting sample.

FIG. 9B illustrates the "band-pass filter" mode of operation utilizing a quadrupole assembly comprised of RF-only pre-quads and RF/DC quadrupoles. Low mass species (higher mobility species, Species A) are lost through RF displacement to the pre-quads, higher mass species (lower mobility species, Specie C) are lost due to lack of radial displacement from gas flow, and only intermediate species (Specie B) are transmitted on-axis and detected.

FIG. 10 illustrates the "band-pass filter" mode of operation where low mass species (higher mobility species, Specie A) are removed by virtue of an axial stop, higher mass species (lower mobility species, Specie C) are lost due to lack of radial displacement from gas flow, and intermediate species (Specie B) are transmitted on-axis and detected.

In the operation of this device as an atmospheric inlet to the mass spectrometer (FIG. 7), the detector 96 is replace with the conductance tube 99 through which focused ions will travel on their path into a vacuum system. Both focusing fields and viscous forces will cause ions upstream of the ion exit opening 98 to travel into the vacuum system of the mass spectrometer in region 180. It is intended that this atmospheric RF/DC focusing device be coupled to the vacuum inlet of any conventional mass spectrometer or the atmospheric pressure inlet to any ion mobility spectrometer.

Operation of Off-Axis Device (as Shown in FIGS. 11A and 11B)

This device operates in a similar manner to the axial devices with the notable exception that ions are allowed to fall off-axis under the influence of sufficient DC fields to drive the target analyte to an off-axis detector or conductance tube at or near the opposite polarity of the analyte ion. At fixed RF and DC potentials, specific ions will deposit at specific positions along the length of the rods; higher mobility species falling off the saddle first and lower mobility species later. Detectors 97*a*, 97*b* can be placed at an appropriate position along the axis to collect specific analytes. The rod voltages can also be scanned to direct a range of analytes to the detector 97. Conversely, the rod voltages can be fixed to collect a specific target ionic species or a range of species.

Operation of a Trapping Device (As Shown in FIGS. 12A and 12B)

This embodiment operates in a sequential rather than a continuous manner. Sample is introduced into the quadrupole assembly from any of a wide variety of pulsed (i.e., MALDI) or continuous (i.e., electrospray) sources. The ions collected are directed onto the axis of the quadrupole assembly and gas flow directs them downstream toward exit lens 94. In this embodiment, a retarding potential can be applied to retard transmission of some or all of the ionic species directed down the quadrupole assembly. When the quadrupole pseudo-potential well becomes full, the ions can then be released following out through the ion exit opening 98 or conductance tube into vacuum 99 for detection, mass analysis, or even conventional ion mobility analysis.

Operation of Low Pressure Mode (As Shown in FIG. 13)

Reducing the pressure of the Quadrupole Region 30 to pressures somewhat below atmospheric allows some increase in the inertial components of motion relative to atmospheric pressure. Operating at lower pressures allows more effective RF focusing and potentially higher selectivity with the limitation of operating potentials below the breakdown potentials prescribed in FIG. 3. Operating from 10 to 300 torr and lower RF and DC potentials provide an operating mode where RF fields can contribute more to the collection, focusing, and detection of gas-phase ions.

Advantages

From the description above, a number of advantages of our atmospheric RF/DC mass and mobility analyzer become evident:

(a) Without the need for a vacuum interface between the ion source and the RF/DC mass and mobility analyzer there is no need for high vacuum pumps, vacuum interlocks and feed-throughs, small apertures for interfacing—all of which are expensive and can complicate the interface design.

(b) Without the need for a vacuum chamber, high vacuum pumps, vacuum feed-throughs, etc., all of which add to the cost of the analyzer, the RF/DC mass and mobility analyzer can be mass produced inexpensively.

(c) Being at atmospheric pressure there is no need for vacuum interlocks, thus avoiding the need to vent the system for maintenance or repair.

(d) Not requiring a vacuum chamber and large power requirements of the high vacuum pumps, the mass analyzer can be made of light weight material and not be tethered to one location.

CONCLUSION, RAMIFICATION, AND SCOPE

Accordingly, the reader will see that the atmospheric RF/DC mass and mobility filter of this invention can be used to separate gas-phase ions from an electrospray ion source or other atmospheric pressure ion sources based on mobility characteristics, and can be used as an atmospheric inlet to a mass analyzer, a ion mobility analyzer, or a combination thereof; and also can be used to pass a wide or a narrow mass range of ions. In addition, segmented quadrupole assemblies or assemblies arranged in parallel can be operated with independent values of frequency and RF and DC potentials; thus optimizing the passage of ions while eliminating charged and uncharged particles which may contaminate ion detectors or clog small apertures.

Furthermore, the atmospheric RF/DC mass and mobility analyzer has the additional advantages in that:

it permits the production of RF/DC mass and mobility analyzers to be inexpensive;

it provides an atmospheric RF/DC mass and mobility analyzer which can be made from molded materials;

it provides an atmospheric RF/DC mass and mobility analyzer which is both lightweight and portable;

it allows access to and maintenance of RF/DC mass and mobility analyzers to be simple and accomplished without specialized tools;

it allows atmospheric or near-atmospheric ionization sources to be easily interfaced to RF/DC mass and mobility analyzers without the need for complex and costly vacuum system interface; and it allows for all or nearly all ions formed at atmospheric pressure to be introduced into the RF/DC mass and mobility analyzer.

Although the description above contains many specifications, these should not be construed as limiting the scope of the invention but as merely providing illustrations of some of the presently preferred embodiments of this invention. For example, the RF/DC mass and mobility analyzer can be composed of multiple RF/DC, RF/DC-RF, or RF-RF/DC filters in parallel or in series; the rods of the RF/DC mass and mobility analyzer can have other shapes such as, tapered, hourglass, barrel, etc.; the rods can have various cross-sectional shapes, such as circular, oval, hyperbolic, circular trapezoid, etc.; the rods can be composed of solid cylinders, tubes, tubes made of fine mesh, composites, etc.; the ion source region can be composed of other means of atmospheric or near atmospheric ionization, such as photoionization; corona discharge, electron-capture, inductively couple plasma; single or multiple ion sources can be configured with individual or arrays of RF/DC mass and mobility analyzers; the ion detector can be have other means of detecting gas-phase ions, such as active pixel sensors, etc.

Thus the scope of the invention should be determined by the appended claims and their legal equivalents, rather than by the examples given.

We claim:

1. Apparatus for the focusing and selecting of gas-phase ions and/or particles at or near atmospheric pressure, the apparatus comprising:

a. a dispersive source of ions;

b. a means for providing a concentric flow of gas;

c. a conductive high-transmission laminated element comprised alternating layers of metal and insulating laminates, said laminated element populated with a plurality of holes and an entrance lens so that said gas and ions pass unobstructed through into an multi-element assembly, said laminated element being supplied with a regulated gas supply providing a constant and directed flow of gas, said laminated element also being supplied with an attracting electric potential by connection to a high voltage supply, generating an electrostatic field between said source of ions and said laminated element;

d. a multi-element assembly for receiving and transmitting gas and focused ions, the said multi-element assembly being supplied with both RF and DC electric potentials by connection to a high voltage supply so that said multi-element assembly may act as a band pass filter for said ions and generating an electrostatic field between backside of said entrance lens and multi-element assembly;

e. an ion detector for detecting ions exiting said multi-element assembly, whereby to provide detection of ions separated at atmospheric pressure through said mass filter.

2. The apparatus of claim 1 wherein the exit of two holes of said high-transmission laminated element is co-axial and adjacent to one of the elements of said multi-element assembly.

3. The apparatus of claim 1 wherein said multi-element assembly is further comprised of a stop disposed coaxial with said laminated element and equal distant between said elements of said multi-element assembly, said stop preventing the passage of ion.

4. The apparatus of claim 1 wherein said ion detector is an analytical apparatus with an aperture or capillary tube sandwiched between said multi-element assembly and said analytical apparatus, said small cross-sectional area of ions being directed through said aperture into said analytical apparatus.

5. The apparatus of claim 4 wherein said analytical apparatus comprises a mass spectrometer, an ion mobility spectrometer, or a combination thereof.

6. The apparatus of claim 1 wherein said multi-element assembly is comprised of metal poles, metal rods, metal tubes, metal plates, perforated metal, parallel wires, or combinations thereof.

7. The apparatus of claim 1 wherein said gas-phase ions are formed by means of atmospheric or near atmospheric ionization sources such as, electrospray, atmospheric pressure chemical ionization, atmospheric laser desorption, photoionization, discharge ionization, inductively coupled plasma ionization.

8. The apparatus of claim 1 wherein said atmospheric or near atmospheric ionization source is made up of a plurality of said atmospheric or near atmospheric ion sources operated simultaneously or sequentially.

9. Apparatus for the focusing and selecting of an aerosol of gas-phase ions or charged particles at or near atmospheric pressure, the apparatus comprising:

a. a source of ions or charged particles;

b. a concentric flow of gas;

c. a conductive high-transmission laminated element comprised of alternating layers of insulating and metal laminates and an entrance lens, said laminated element populated with a plurality of holes through which said gases and ions from said source pass unobstructed into an RF/DC quadrupole, said laminated element being supplied with a regulated gas supply providing a constant and directed flow of gas, said laminated element also being supplied with an attracting electric potential by connection to a high voltage supply, and generating an electrostatic field between the said source of ions, from atmospheric ion source, and said laminated element;

d. a RF/DC quadrupole assembly for receiving and transmitting gas and focused ions, the said quadrupole being supplied with both RF and DC electric potentials by connection to a high voltage supply or quadrupole controller so that said quadrupole assembly may act as a band pass filter for said ions and generating an electrostatic field between said laminated element and said quadrupole assembly;

e. a stop disposed coaxial with and downstream of said laminated element preventing the passage of ions passing through the center of said quadrupole and allowing the passage of ions disposed radially to said stop;

f. a capillary tube or aperture for receiving said ions, said capillary tube disposed on-axis with said multi-element assembly, said capillary tube being supplied with ion-attracting electrical potential by connection to said high voltage supply, and generating an electrostatic field between said multi-element assembly and said aperture;

g. an analytical apparatus in communication with the said capillary tube, wherein said capillary tube is sandwiched between said multi-element assembly and said analytical apparatus, whereby to provide detection of ions that have passed through said quadrupole.

10. The apparatus of claim 9 wherein said analytical apparatus comprises a mass spectrometer, an ion mobility spectrometer, or combination thereof.

11. The apparatus of claim 9 wherein said gas-phase ions are formed by means of atmospheric or near atmospheric ionization sources such as, electrospray, atmospheric pressure chemical ionization, atmospheric laser desorption, photoionization, discharge ionization, inductively coupled plasma ionization.

12. A method of mass analysis and detection at atmospheric pressure utilizing an ion source region, a focusing region, a RF/DC quadrupole region, and detector region, admitting a concentric flow of gas into said ion source region and focusing region so that gas-phase ions and gases may travel through said focusing region, said RF/DC quadrupole region, and into said detector region, said method comprising:

a. producing ions of a trace substance in said ion source region at atmospheric or higher than atmospheric pressure;

b. directing said ions by providing electrostatic and electrodynamic potentials and a concentric flow of gas through a laminated high transmission element in said focusing region into a RF/DC quadrupole in said RF/DC quadrupole region, and then detecting said ions in said detector region to analyze said substance;

c. placing DC voltages on said laminated high transmission element so that said laminated element high transmission element acts to guide and focus ions therethrough, through;

d. placing RF and DC voltages on said RF/DC quadrupole so that said RF/DC quadrupole acts as a band pass filter, allowing the passage of a selected population gas-phase ions and preventing the passage of other selected gas-phase ions based on a combination of the mobility of said ions, electrostatic and electrodynamic potentials of said quadrupole, introducing said ions into said quadrupole near the rods that make up said quadrupole, physical stops disposed along the centerline of said quadrupole, and flow of said concentric flow of gas;

e. detecting said ions that have passed through said quadrupole assembly and are exiting said quadrupole assembly along the centerline of said quadrupole assembly;

whereby to provide a means of determining the mass of said ions at atmospheric pressure.

13. The method according to claim 12, wherein providing the transfer, focusing, selection, and detection of charged particles or ions from dispersive sources for gas-phase ion analysis, comprises a plate or cup, such as a faraday cup, in said detector region for detecting said ions exiting said quadrupole assembly.

14. The method according to claim 12, wherein providing the transfer, focusing, selection, and detection of charged particles or ions from dispersive sources for gas-phase ion analysis, comprises a capillary tube in said detector region for transferring said ions exiting along the centerline of said quadruple assembly into an analytical apparatus.

15. The method according to claim 14, wherein providing the transfer, focusing, selection, and detection of charged particles or ions from dispersive sources for gas-phase ion analysis, said analytical apparatus comprises a mass spectrometer, ion mobility spectrometer, or combination thereof.

16. The method according to claim 12, wherein providing the transfer, focusing, selection, and detection of charged particles or ions from dispersive sources for gas-phase ion analysis, said RF/DC quadrupole is replaced with another RF/DC device, such as a octopole, hexapole, monopole, etc.

17. The method according to claim 12, wherein providing the transfer, focusing, selection, and detection of charged particles or ions from dispersive sources for gas-phase ion analysis, comprises a plurality of dispersive sources of said ions and charged particles.

18. A method of mass analysis and detection at atmospheric pressure utilizing an ion source region, a focusing region, a RF/DC quadrupole region, and detector region, admitting a concentric flow of gas into said ion source region and focusing region so that gas-phase ions and gases may travel through said focusing region, said RF/DC quadrupole region, and into said detector region, said method comprising:

a. producing ions of a trace substance in said ion source region at atmospheric or higher than atmospheric pressure;

b. directing said ions by providing electrostatic and electrodynamic potentials and a concentric flow of gas through a laminated high transmission element in said focusing region into a RF/DC quadrupole in said RF/DC quadrupole region, and then detecting said ions in said detector region to analyze said substance;

c. placing DC voltages on said laminated high transmission element so that said laminated element high transmission element acts to guide and focus ions therethrough, through;

d. placing RF and DC voltages on said RF/DC quadrupole so that said RF/DC quadrupole acts as a band pass filter, allowing the passage of a selected population gas-phase ions and preventing the passage of other selected gas-phase ions based on a combination of the mobility of said ions, electrostatic and electrodynamic potentials of said quadrupole, introducing said ions into said quadrupole near the rods that make up said quadrupole, physical stops disposed along the centerline of said quadrupole, and flow of said concentric flow of gas;

e. detecting said ions radially that have passed through said quadrupole assembly;

whereby to provide a means of determining the mass of said ions at atmospheric pressure.

19. The method according to claim 18, wherein providing the transfer, focusing, selection, and detection of charged particles or ions from dispersive sources for gas-phase ion analysis, said RF/DC quadrupole is comprised of metal tubes, perforated metal, gridded surface, or combination thereof.

20. The method according to claim 18, wherein providing the transfer, focusing, selection, and detection of charged particles or ions from dispersive sources for gas-phase ion analysis, comprises a faraday cup or multiple faraday cups disposed radially around said quadrupole for detecting ions that have passed through the rods of said quadrupole.

* * * * *